US012811793B2

(12) United States Patent
Pearse

(10) Patent No.: US 12,811,793 B2
(45) Date of Patent: Nov. 24, 2026

(54) METHOD, APPARATUS, SYSTEM, AND NON-TRANSITORY COMPUTER READABLE MEDIUM FOR USER VERIFICATION AND AUTHENTICATION

(71) Applicant: Munomo, LLC, Dover, DE (US)

(72) Inventor: Christopher Andrew Pearse, Dover, DE (US)

(73) Assignee: vSMSC Holdings LLC, Sheridan, WY (US)

( * ) Notice: Subject to any disclaimer, the term of this patent is extended or adjusted under 35 U.S.C. 154(b) by 0 days.

(21) Appl. No.: 18/853,946

(22) PCT Filed: Apr. 5, 2022

(86) PCT No.: PCT/US2022/023426
§ 371 (c)(1),
(2) Date: Oct. 3, 2024

(87) PCT Pub. No.: WO2023/195974
PCT Pub. Date: Oct. 12, 2023

(65) Prior Publication Data
US 2025/0219839 A1 Jul. 3, 2025

(51) Int. Cl.
*H04L 9/32* (2006.01)
*H04L 9/40* (2022.01)

(52) U.S. Cl.
CPC .......... *H04L 9/3228* (2013.01); *H04L 9/3247* (2013.01); *H04L 63/0853* (2013.01)

(58) Field of Classification Search
CPC . H04L 9/3228; H04L 9/3247; H04L 63/0853; H04L 9/3242; H04L 63/0838; H04W 12/069; H04W 4/14
See application file for complete search history.

(56) References Cited

U.S. PATENT DOCUMENTS 7,873,376 B2 1/2011 Coelho
8,549,594 B2 10/2013 Lin
(Continued)

FOREIGN PATENT DOCUMENTS

WO 201334951 A1 3/2013

OTHER PUBLICATIONS

International Preliminary Report on Patentability for International Application No. PCT/2022/023426 mailed on Oct. 17, 2024.
(Continued)

*Primary Examiner* — Amir Mehrmanesh
*Assistant Examiner* — Aayush Aryal
(74) *Attorney, Agent, or Firm* — Harness, Dickey & Pierce, P.L.C.

(57) ABSTRACT

A method, apparatus, system, and non-transitory computer readable medium for performing user verification and authentication may include receiving a network request from a client device associated with an online service in response to a user access attempt of the online service associated with a user, the network request including message recipient information for a mobile-terminated (MT) short message service (SMS) message and a unique one-time password or pin (OTP) code associated with the user, calculating at least one first signature based on the network request and a shared secret key, the shared secret key shared with the client device, the at least one first signature associated with the user, transmitting a network response to the client device, the network response causing the client device to transmit a call-to-action (CTA) message to at least one user device associated with the user, and determining a status of the user access attempt.

25 Claims, 12 Drawing Sheets

(56) References Cited

U.S. PATENT DOCUMENTS

| | | | | |
|---|---|---|---|---|
| 9,363,259 | B2 | 6/2016 | Chenna | |
| 9,553,864 | B2 | 1/2017 | Jillings | |
| 9,860,233 | B2 | 1/2018 | Berkovitz et al. | |
| 10,129,247 | B2 | 11/2018 | Stubblefield | |
| 10,554,410 | B2 | 2/2020 | Lee | |
| 10,716,003 | B2 | 7/2020 | Soulez et al. | |
| 11,627,463 | B2 * | 4/2023 | Triest | H04L 63/0838 726/6 |
| 2011/0060913 | A1 * | 3/2011 | Hird | H04L 9/0863 713/184 |
| 2013/0333008 | A1 * | 12/2013 | Tapling | H04L 63/0853 726/7 |
| 2014/0096215 | A1 * | 4/2014 | Hessler | H04W 12/06 726/7 |
| 2014/0171035 | A1 * | 6/2014 | Frederick | G06Q 10/10 455/414.1 |
| 2015/0106265 | A1 | 4/2015 | Stubblefield et al. | |
| 2016/0050199 | A1 * | 2/2016 | Ganesan | G06F 21/33 726/7 |
| 2016/0285871 | A1 * | 9/2016 | Chathoth | H04L 63/0807 |
| 2016/0366589 | A1 * | 12/2016 | Jean | H04L 63/0892 |
| 2017/0187708 | A1 * | 6/2017 | Moore | H04L 63/0807 |
| 2017/0364911 | A1 * | 12/2017 | Landrok | G06Q 20/385 |
| 2019/0281053 | A1 * | 9/2019 | Brown | H04W 12/06 |
| 2019/0394189 | A1 * | 12/2019 | Thirumalai | H04L 63/0838 |
| 2020/0162454 | A1 * | 5/2020 | Jain | G06F 21/335 |
| 2020/0250664 | A1 * | 8/2020 | Kumar | G06Q 20/3823 |
| 2020/0351658 | A1 * | 11/2020 | Soulez | H04M 3/42042 |
| 2021/0204121 | A1 | 7/2021 | Rule et al. | |
| 2021/0233097 | A1 | 7/2021 | Doumar et al. | |
| 2022/0078184 | A1 * | 3/2022 | Traynor | H04W 12/069 |
| 2022/0116374 | A1 * | 4/2022 | Nair | H04L 51/046 |

OTHER PUBLICATIONS

International Search Report and Written Opinion of the International Searching Authority for International Application No. PCT/2022/023426 mailed on Aug. 3, 2022.

Extended European Search Report dated Mar. 12, 2026 for corresponding European Application No. 22936682.8.

* cited by examiner

FIG. 8B
17:18
Sign Up
It's quick and easy!
First Name
Last Name
Email
Mobile
Password
DD
MM
YYYY
By signing up, you agree to our Terms and Policies.
Sign Up
17:18
Verify
Please tap the button below in order to verify your phone number via SMS.
Cannot send an SMS right now?
Please wait 30 seconds

METHOD, APPARATUS, SYSTEM, AND NON-TRANSITORY COMPUTER READABLE MEDIUM FOR USER VERIFICATION AND AUTHENTICATION

CROSS-REFERENCE TO RELATED APPLICATIONS

This application is a national phase under 35 U.S.C. § 371 of PCT International Application No. PCT/US2022/023426 which has an International filing date of Apr. 5, 2022, the entire contents of each of which are hereby incorporated by reference.

BACKGROUND

Field

Various example embodiments relate to methods, apparatuses, systems, and/or non-transitory computer readable media for performing user verification and/or authentication for an online service.

Description of the Related Art

Various online services, enterprise platforms, social networking services, online financial services, e-commerce platforms, online media services, forums, websites, gaming services, online messaging services, business apps, consumer apps and/or search engines (hereinafter collectively referred to as "online services"), etc., require new users wishing to register a user account to verify and/or authenticate their identities using a form of two-factor authentication (2FA) and/or multi-factor authentication (MFA) prior to authorizing the new user account, for example, using the new user's mobile phone and/or smartphone, email account, etc. For example, during the new user registration process, the new user may be required to provide the online service with the new user's mobile telephone number and/or email address. The online service may transmit a one-time use password or pin (OTP) code via a short message service (SMS) message to the provided mobile telephone number and/or an email to the provided email address, and require the new user to input the one-time use code onto the online service, in order to verify that the provided mobile telephone number and/or email address is genuine and the new user has access to the provided mobile telephone number and/or email address.

Similarly, online services may also use 2FA and/or MFA methods to authenticate the identities of registered users when the user attempts to log into the online service and/or complete online transactions, such as online banking transactions, online purchases, etc., using the user's registered mobile phone number, email account, etc., wherein the online service generates a OTP code, transmits the OTP code to the user's registered mobile phone number and/or email account, and waits for the user to input the OTP code into the online service before the user's log in attempt and/or online transaction, etc., will be authenticated.

However, while 2FA and/or MFA services provide increased security over traditional username/password authentication/verification methods, 2FA and MFA services are also subject to security risks and/or cyber-attacks. One major security risk facing mobile phone number based 2FA and MFA services is subscriber identification module (SIM) swap (and/or SIM cloning) attacks, wherein a malicious actor may fraudulently duplicate a user's SIM card associated with the user's mobile phone and thereby receive access to all of the user's mobile phone communications, including the OTP code transmitted by the online service. Further, SMS transmissions between the online service and the user's mobile phone are insecure, and therefore a malicious actor may intercept the OTP code transmitted using SMS using an IMSI-catcher, etc., and the malicious actor may then steal the OTP code. Additionally, the user's email account may also be compromised by a malicious actor via theft and/or cracking of the user's password for the email account, and any OTP code transmitted to the email account may also be vulnerable. Moreover, malicious actors may use "man-in-the-middle" (MITM) attacks, wherein the user is directed to a fake website controlled by the malicious actor impersonating the online service's website, and when the user inputs their username/password and/or OTP code, the malicious actors use the user inputs to access the genuine online service website.

Accordingly, an approach is desired that provides improved security for authentication and/or verification of new user registration attempts, registered user login attempts, online transaction attempts, etc., while causing no and/or minimal further inconvenience to the user.

SUMMARY

At least one example embodiment may be related to a server for authenticating and verifying users of an online service.

In at least one example embodiment, the server may include a memory storing computer readable instructions, and processing circuitry configured to execute the computer readable instructions to cause the server to, receive a network request from a client device associated with the online service in response to a user access attempt of the online service associated with a user, the network request including message recipient information for a mobile-terminated (MT) short message service (SMS) message and a unique one-time password or pin (OTP) code associated with the user, calculate at least one first signature based on the network request and a shared secret key, the secret key shared with the client device, the at least one first signature associated with the user, transmit a network response to the client device, the network response causing the client device to transmit a call-to-action (CTA) message to at least one user device associated with the user, determine whether a mobile-originated (MO) SMS message corresponding to the CTA message was received within a desired response time period, and based on results of the determination, determine a status of the user access attempt.

Some example embodiments provide that the user access attempt corresponds to at least one of a user account creation attempt on the online service, a user account log-in attempt on the online service, a transaction attempt on the online service a new user device log-in attempt on the online service, a log-in attempt at a new geographical location, a password reset with the online service, a new support request with the online service, adding or editing personal account information with the online service, or any combinations thereof.

Some example embodiments provide that the message recipient information includes at least one of a mobile phone number associated with the user, a public switched telephone network (PSTN) phone number associated with the user, a virtual phone number associated with the user, a proxy phone number associated with the server, a proxy phone number associated with the client device, or any combinations thereof.

Some example embodiments provide that the server is further caused to receive the MO SMS message from the at least one user device via the server, or receive the MO SMS message from the at least one user device via the client device, determine the status of the user access attempt based on contents of the received MO SMS message, the calculated at least one first signature, and the desired response time period, and transmit the determined status of the user access attempt to the client device.

Some example embodiments provide that the MO SMS message includes a second signature, and the server is further caused to determine the status of the user access attempt by, determining whether the MO SMS message is received before expiration of the desired response time period, determining whether the second signature matches at least one of the calculated at least one first signature associated with the user, and determining whether the matching first signature was calculated during the desired response time period.

Some example embodiments provide that the server is further caused to perform a home location register (HLR) lookup on a phone number associated with the at least one user device to determine an International Mobile Subscriber Identity (IMSI) number associated with the phone number, determine fraud potential information associated with the user access attempt based on the determined IMSI number, and transmit the determined fraud potential information to the client device.

Some example embodiments provide that the network response includes at least one communication account identifying information associated with the server or the client device, the communication account identifying information including at least one of: a local phone number, a national phone number, an international phone number, a toll-free phone number, a mobile phone number, a short code, a long code, a network specific number, or any combinations thereof.

Some example embodiments provide that the at least one user device includes at least a mobile phone device associated with the user, and the server is further caused to generate the MT SMS message in response to the received network request, the MT SMS message including the OTP code associated with the user and the message recipient information, the message recipient information being a phone number associated with the mobile phone device, and transmit the MT SMS message to the mobile phone device associated with the user in response to an expiration of the desired response time period or a determined status of the user access attempt indicating failure.

Some example embodiments provide that the server is further caused to cancel transmission of the MT SMS message to the mobile phone device in response to the determined status of the user access attempt indicating success prior to the expiration of the desired response time period.

Some example embodiments provide that the server is further caused to calculate the at least one first signature by generating a unique keyed-hash using a desired hashing algorithm on at least the OTP code, and the shared secret key.

Some example embodiments provide that the network request includes a message body, and the server is further caused to calculate the at least one first signature by generating a unique keyed-hash using a desired hashing algorithm on the message body included in the network request and the shared secret key.

At least one example embodiment may be related to a client device associated with an online service.

In at least one example embodiment, the client device may include a memory storing computer readable instructions, and processing circuitry configured to execute the computer readable instructions to cause the client device to, receive a user access attempt from a primary user device associated with a user, the user access attempt including at least a phone number associated with the user, generate a unique one-time password or pin (OTP) code associated with the user, transmit a network request to an authentication/verification server, the network request including message recipient information for a mobile-terminated (MT) short message service (SMS) message and the OTP code, calculate at least one first signature associated with the user based on the network request and a shared secret key, the secret key shared with the authentication/verification server, receive a network response from the authentication/verification server, determine a device type of the primary user device, generate a call-to-action (CTA) message for the user based on the determined device type, and transmit the CTA message to the primary user device.

Some example embodiments provide that the phone number associated with the user is at least one of a mobile phone number associated with the user, a public switched telephone network (PSTN) phone number associated with the user, a virtual phone number associated with the user, a proxy phone number associated with the server, a proxy phone number associated with the client device, or any combinations thereof.

Some example embodiments provide that the transmitting of the CTA message causes the primary user device to display the CTA message to the user for a desired response time period.

Some example embodiments provide that the network response includes at least one communication account identifying information associated with the authentication/verification server or associated with the client device, in response to the device type of the primary user device being a mobile phone device, the CTA message includes a clickable CTA, in response to the device type of the primary user device being a non-mobile phone device, the CTA message includes a scannable CTA, the scannable CTA being at least one of a barcode or quick response (QR) code, and the clickable and the scannable CTA are both configured to cause the mobile phone device to automatically compose a mobile-originated (MO) SMS message, the automatically composing the MO SMS message including pre-populating a message recipient field of the MO SMS message with the at least one communication account identifying information associated with the authentication/verification server or the client device, and pre-populating a message body of the MO SMS message with the calculated at least one signature associated with the user.

Some example embodiments provide that the client device is further caused to receive the MO SMS message from the primary user device or a secondary user device, and forward the MO SMS message to the authentication/verification server.

Some example embodiments provide that the client device is further caused to receive a user access attempt status message from the authentication/verification server, the user access attempt status message indicating a determined status of the user access attempt.

Some example embodiments provide that the client device is further caused to transmit a message to the primary user device in response to expiration of the desired response time period or the determined status of the user access attempt indicating failure, the message prompting the user to enter the OTP code, receive a user input from the primary user device, and determine the user access attempt status based on the received user input and the OTP code associated with the user.

Some example embodiments provide that the at least one communication account identifying information associated with the authentication/verification server or the client device is at least one of: a local phone number, a national phone number, an international phone number, a toll-free phone number, a mobile phone number, a short code, a long code, a network specific number, or any combinations thereof.

Some example embodiments provide that the client device is further caused to receive fraud potential information associated with the user access attempt from the authentication/verification server, the fraud potential information determined based on an International Mobile Subscriber Identity (IMSI) number associated with the phone number associated with the user received from a home location register (HLR) lookup performed on the phone number associated with the user, and determine the user access attempt status based on the received fraud potential information.

Some example embodiments provide that the user access attempt corresponds to at least one of a user account creation attempt on the online service, a user account log-in attempt on the online service, a transaction attempt on the online service, a new user device log-in attempt on the online service, a log-in attempt at a new geographical location, a password reset with the online service, a new support request with the online service, adding or editing contact information with the online service or any combinations thereof.

At least one example embodiment may be related to user device associated with a user accessing an online service.

In at least one example embodiment, the user device may include a memory storing computer readable instructions, and processing circuitry configured to execute the computer readable instructions to cause the user device to, transmit a user access attempt to a client device associated with the online service, the user access attempt including at least a phone number associated with the user, receive a call-to-action (CTA) message from the client device, and display the CTA message to the user for a desired response time period.

Some example embodiments provide that the user device is further caused to, receive a user input engaging the CTA message, automatically compose a mobile originated (MO) short message service (SMS) message in response to the user input, the automatically composing the MO SMS message including pre-populating a message recipient field of the MO SMS message with at least one communication account identifying information associated with an authentication/verification server or associated with the client device, and pre-populating a message body of the MO SMS message with at least one signature associated with the user calculated by the client device, transmit the MO SMS message to the at least one communication account identifying information associated with the authentication/verification server or the client device, and receive a user access attempt status message corresponding to the user access attempt from the client device in response to the transmitted MO SMS message.

Some example embodiments provide that the user device is further caused to, receive a mobile-terminated (MT) SMS message from the authentication/verification server in response to an expiration of a desired response time period, the message containing a unique one-time password or pin (OTP) code, receive a user input from the user containing the OTP, and transmit a user response to the client device, the user response including the user input, and receive a user access attempt status message from the client device in response to the transmitted user response.

Some example embodiments provide that the at least one phone number associated with the authentication/verification server or the client device is at least one of: a local phone number, a national phone number, an international phone number, a toll-free phone number, a mobile phone number, a short code, a long code, a network specific number, or any combinations thereof.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
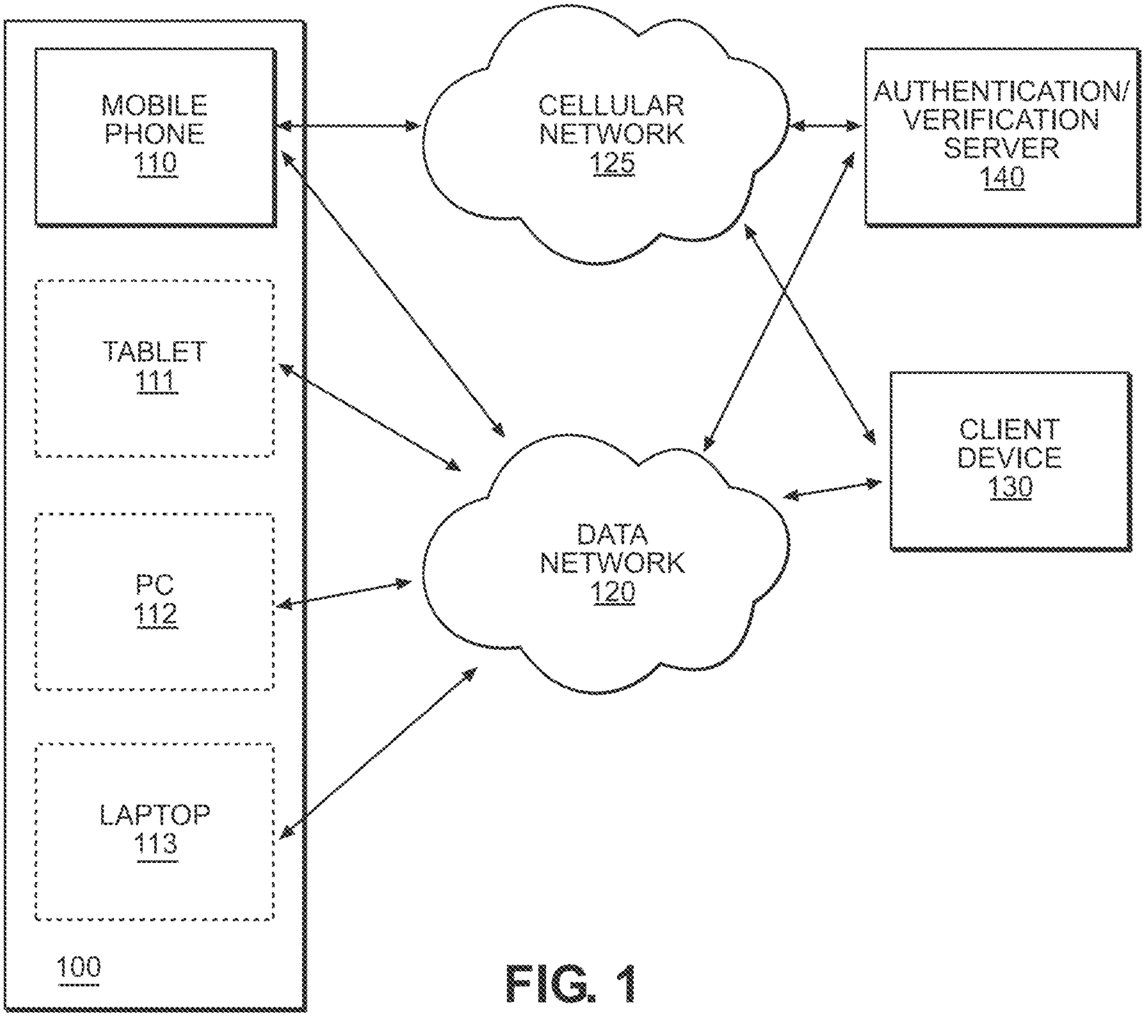
FIG. 1 illustrates a system associated with an online service according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term “and/or,” includes any and all combinations of one or more of the associated listed items.

It will be understood that when an element is referred to as being “connected,” or “coupled,” to another element, it can be directly connected or coupled to the other element or intervening elements may be present. In contrast, when an element is referred to as being “directly connected,” or “directly coupled,” to another element, there are no intervening elements present. Other words used to describe the relationship between elements should be interpreted in a like fashion (e.g., “between,” versus “directly between,” “adjacent,” versus “directly adjacent,” etc.).

The terminology used herein is for the purpose of describing particular embodiments only and is not intended to be limiting of the example embodiments. As used herein, the singular forms “a,” “an,” and “the,” are intended to include the plural forms as well, unless the context clearly indicates otherwise. It will be further understood that the terms “comprises,” “comprising,” “includes,” and/or “including,” when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term “memory” may represent one or more devices for storing data, including random access memory (RAM), magnetic RAM, core memory, and/or other machine readable mediums for storing information. The term “storage medium” may represent one or more devices for storing data, including read only memory (ROM), random access memory (RAM), magnetic RAM, core memory, magnetic disk storage mediums, optical storage mediums, flash memory devices and/or other machine readable mediums for storing information. The term “computer-readable medium” may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term “circuitry” and/or “hardware circuitry” may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone, a smart device, and/or server, etc., to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

At least one example embodiment refers to methods performing user authentication and/or verification on an online service, such as enterprise platforms, social networking services, online financial services, e-commerce platforms, online media services, forums, websites, gaming services, online messaging services, business apps, consumer apps and/or search engines, etc., but the example embodiments are not limited thereto, and the example embodiments may further apply to other online services which require the creation and/or access of user accounts.

FIG. 1 illustrates an authentication/verification system associated with an online service according to at least one example embodiment. As shown in FIG. 1, the authentication/verification system may include at least one user device 100, such as a mobile phone 110 (e.g., a smartphone, etc.), a tablet 111, a personal computer (PC) 112, and/or a laptop 113, etc., a data network 120, a cellular network 125, at least one client device 130 (e.g., one or more servers, a cloud network, etc.) associated with the online service, and/or at least one authentication/verification server 140, etc., but the example embodiments are not limited thereto and the example embodiments may include a greater or lesser number of constituent elements. For example, a user may use two or more user devices 100 (e.g., a mobile phone 110 and a PC 112, etc.) to access the at least one client device 130 and/or the authentication/verification server 140, etc. Additionally, in some example embodiments, the system may include a plurality of servers associated with (and/or hosting, implementing, etc.) the online service, the system may include less than four user devices, the system may include greater than four user devices, etc.

According to at least one example embodiment, the client device 130 may host and/or provide functionality of at least a portion of the online service, etc., and each of the at least one user device 100 may allow a respective user to access the online service via the client device 130. Additionally, the authentication/verification server 140 may provide user authentication and/or user verification services in combination with the client device 130. For example, when a user attempts to authenticate a new user account on the online service through the client device 130, the client device 130 may transmit a network request for verification of the new user to the authentication/verification server 140, etc. The user authentication and verification method according to some example embodiments will be discussed in more detail in connection with FIGS. 4 to 8D. Moreover, according to at least one example embodiment, the functionality of the client device 130 and the authentication/verification server 140 may be combined into a single entity, etc.

The at least one user device 100, the client device 130, and/or the authentication/verification server 140 may be connected over the data network 120 and/or the cellular network 125, and the data network 120 may correspond to a wireless network, such as a cellular wireless access network (e.g., a 3G wireless access network, a 4G-Long Term Evolution (LTE) network, a 5G-New Radio (e.g., 5G) wireless network, a WiFi network, a satellite network, etc.) and/or a wired network (e.g., a fiber network, a cable network, a public switched telephone network (PSTN), etc.). Additionally, the cellular network 125 may correspond to cellular phone network (e.g., a 3G wireless access network, a 4G-Long Term Evolution (LTE) network, a 5G-New Radio (e.g., 5G) wireless network, etc.), and/or any other network which may support telephony technology, such as SMS, multimedia message service (MMS), etc., but the example embodiments are not limited thereto. The cellular network 125 may be used by user devices 100 which are enabled to connect to a wireless phone network, such as the mobile phone 110, a cellular network enabled tablet 111, etc., and enables communication between the user device 100 with the client device 130 and/or the authentication/verification server 140. For example, the mobile phone 110 may receive SMS messages and/or MMS messages from the client device 130 and/or the authentication/verification server 140 over the cellular network 125, but the example embodiments are not limited thereto.

Additionally, the client device 130 and/or the authentication/verification server 140 may connect to each other and/or other servers (not shown), over the data network 120, and each of the user devices 110, 111, and/or 112 may connect to other user devices over data network 120. The data network 120 may refer to the Internet, an intranet, a wide area network, etc., but is not limited thereto.

While certain components of a system associated with an online service are shown in FIG. 1, the example embodiments are not limited thereto, and the system may include components other than that shown in FIG. 1, which are desired, necessary, and/or beneficial for operation of the underlying networks within the system, such as base stations, access points, switches, routers, nodes, servers, gateways, etc.

Figure 2:
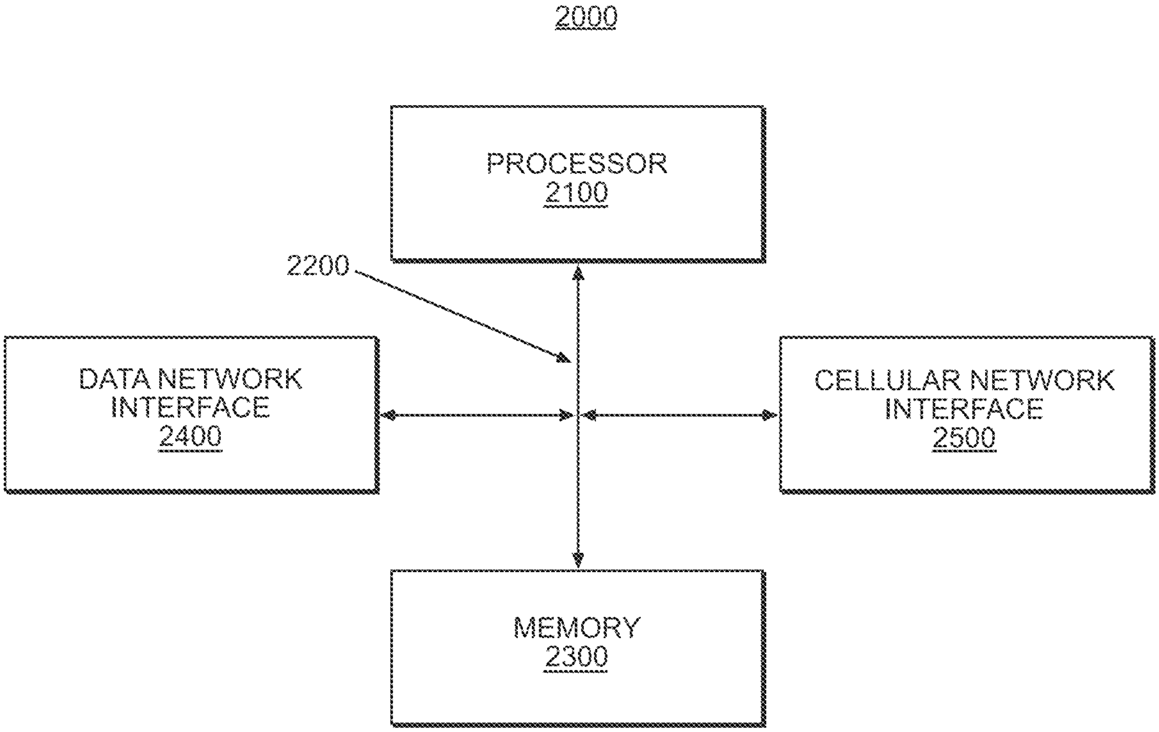
FIG. 2 illustrates a block diagram of an example server and/or example client device according to at least one example embodiment.

FIG. 2 illustrates a block diagram of an example server and/or example client device of the online service according to at least one example embodiment. The server 2000 of FIG. 2 may correspond to the client device 130 and/or the authentication/verification server 140 of FIG. 1, but the example embodiments are not limited thereto.

Referring to FIG. 2, a server 2000 may include processing circuitry, such as at least one processor 2100, at least one communication bus 2200, a memory 2300, at least one network interface 2400, and/or at least one cellular network interface 2500, etc., but the example embodiments are not limited thereto. For example, the server 2000 may further include a display panel (not shown), such as a monitor, a touchscreen, etc., one or more input/output (I/O) devices, e.g., a keyboard, a touchscreen, a mouse, a microphone, a camera, a speaker, etc., but the example embodiments are not limited thereto. The memory 2300 may include various special purpose program code including computer executable instructions which may cause the server 2000 to perform the one or more of the methods of the example embodiments, including but not limited to computer executable instructions related to providing an online service, providing an authentication service, and/or providing a verification service, etc., but the example embodiments are not limited thereto.

In at least one example embodiment, the processing circuitry may include at least one processor (and/or processor cores, distributed processors, networked processors, etc.), such as the at least one processor 2100, which may be configured to control one or more elements of the server 2000, and thereby cause the server 2000 to perform various operations. The processing circuitry (e.g., the at least one processor 2100, etc.) is configured to execute processes by retrieving program code (e.g., computer readable instructions) and/or data from the memory 2300 to process them, thereby executing special purpose control and functions of the entire server 2000. Once the special purpose program instructions are loaded into the at least one processor 2100, the at least one processor 2100 executes the special purpose program instructions, thereby transforming the at least one processor 2100 into a special purpose processor.

In at least one example embodiment, the memory 2300 may be a non-transitory computer-readable storage medium and may include at least one of a random access memory (RAM), a read only memory (ROM), and/or a permanent mass storage device such as a disk drive, a solid state drive, etc., or any combinations thereof. Stored in the memory 2300 is program code (i.e., computer readable instructions) related to operating the online service (e.g., enterprise platforms, social networking services, online financial services, e-commerce platforms, online media services, forums, websites, gaming services, online messaging services, business apps, consumer apps and/or search engines, etc.) and/or the server 2000, such as the methods discussed in connection with FIGS. 4 to 5 and 7A to 7C, the at least one network interface 2400, and/or at least one cellular network interface 2500, etc. Such software elements may be loaded from a non-transitory computer-readable storage medium independent of the memory 2300, using a drive mechanism (not shown) connected to the server 2000, or via the at least one network interface 2400, and/or at least one cellular network interface 2500, etc.

In at least one example embodiment, the at least one communication bus 2200 may enable communication and/or data transmission to be performed between elements of the server 2000. The bus 2200 may be implemented using a high-speed serial bus, a parallel bus, and/or any other appropriate communication technology. According to some example embodiments, the server 2000 may include a plurality of communication buses (not shown).

The server 2000 is associated with an online service and may operate as, for example, a web server, an application server, an e-commerce server, an online banking server, an enterprise server, a messaging server, a social networking server, a search server, etc., and may be configured to provide the corresponding services to at least one user of the online service, including but not limited to facilitating new user registrations on the online service, processing user log-in attempts on the online service, processing online transactions using the online service, resetting a user password associated with the user account on the online service, and/or general user actions on the online service, etc., but the example embodiments are not limited thereto. Additionally, in some example embodiments, the server 2000 may be configured to provide security related services for the online service, such as verifying a new device used by a user to log into the online service, verifying a new IP address and/or new geographical location from where a user is logging into the online account, etc. Further, the server 2000 may also provide communication and/or messaging services for the one or more users of the online service which allows the online service and/or the authentication/verification service to contact and/or message one or more users of the online service, allows users of the online service to contact and/or message one or more other users of the online service via the server 2000.

According to at least one example embodiment, the server 2000 may host a website associated with the online service which is viewed by the user using a web browser installed on one or more of user devices 100, but the example embodiments are not limited thereto. In other example embodiments, the server 2000 may communicate (e.g., transmit and/or receive) data with a software application (e.g., an app, etc.) associated with the online service which is installed on the one or more user devices 100, etc. Additionally, in other example embodiments, the user may access the online service using both the website and the software application using two or more user devices 100, such as a mobile phone 110 and a PC 112, etc. The server 2000 may transmit, display, and/or present at least one graphical user interface (GUI) associated with the online service and/or the user authentication/verification process using the website and/or software application associated with the online service to the user device(s) 100. The GUIs according to some example embodiments will be discussed in further detail in connection with FIGS. 8A to 8D.

While FIG. 2 depicts an example embodiment of a server 2000, the server 2000 is not limited thereto, and may include additional and/or alternative architectures that may be suitable for the purposes demonstrated. For example, the functionality of the server 2000 may be divided among a plurality of physical, logical, and/or virtual server and/or computing devices, network elements, etc., but the example embodiments are not limited thereto.

Figure 3:
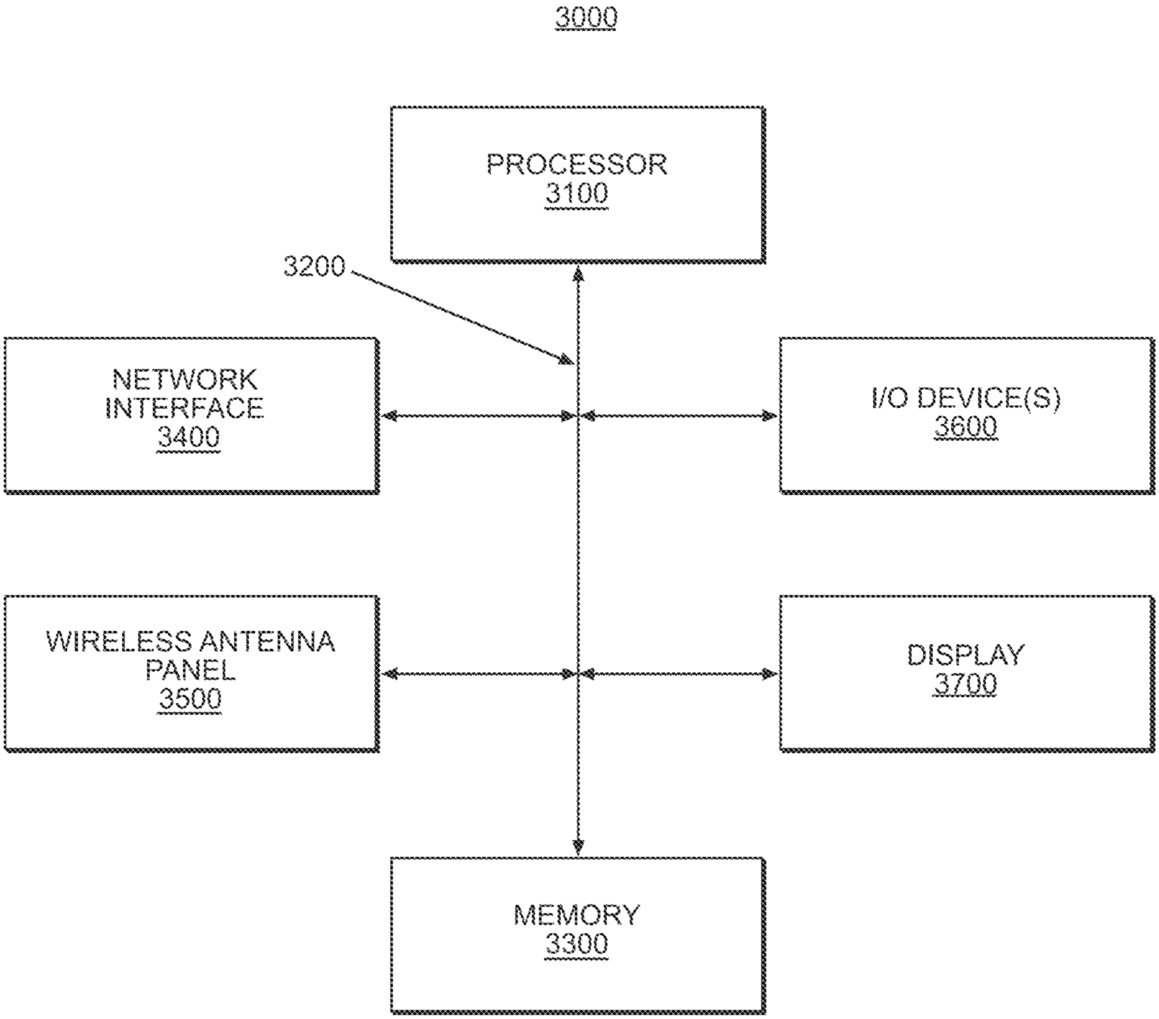
FIG. 3 illustrates a block diagram of an example user device according to at least one example embodiment.

FIG. 3 illustrates a block diagram of an example user device according to at least one example embodiment. The example user device 3000 of FIG. 3 may correspond to one or more of the plurality of user devices 100 of FIG. 1, but the example embodiments are not limited thereto. According to at least one example embodiment, the user device 3000 of FIG. 3 may be a computing device, such as a personal computer (PC), a laptop, a database, a server, a smartphone, a tablet, any other smart devices, a wearable device, an Internet-of-Things (IoT) device, a virtual reality (VR) and/or augmented reality (AR) device, a virtual assistant device, a gaming console, a Personal Digital Assistant (PDA), etc., but the example embodiments are not limited thereto.

Referring to FIG. 3, a user device 3000 may include processing circuitry, such as the at least one processor 3100, at least one communication bus 3200, a memory 3300, at least one network interface 3400, at least one wireless antenna panel 3500, at least one input/output (I/O) device 3600 (e.g., a keyboard, a touchscreen, a mouse, a microphone, a camera, a speaker, a haptic feedback device, etc.), and/or a display panel 3700 (e.g., a monitor, a touchscreen, a VR display, an AR display, etc.), etc. However, the example embodiments are not limited thereto, and the user device 3000 may include a greater or lesser number of constituent components. For example, the user device 3000 may also include a battery, at least one location sensor, one or more additional sensors (e.g., thermometers, humidity sensors, pressure sensors, motion sensors, accelerometers, etc.), actuators, etc. Additionally, the wireless antenna panel 3500, the display panel 3700, and/or I/O device 3600, etc., of user device 3000 may be optional.

In at least one example embodiment, the processing circuitry may include at least one processor (and/or processor cores, distributed processors, networked processors, etc.), such as the at least one processor 3100, which may be configured to control one or more elements of the user device 3000, and thereby cause the user device 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire user device 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, a solid state drive, etc., or any combinations thereof. Stored in the memory 3300 is program code (i.e., computer readable instructions) related to operating the user device 3000, such as the methods discussed in connection with FIGS. 6 to 7C, the network interface 3400, and/or the wireless antenna panel 3500, etc. Such software elements may be loaded from a non-transitory computer-readable storage medium independent of the memory 3300, using a drive mechanism (not shown) connected to the user device 3000, or via the network interface 3400 and/or wireless antenna panel 3500, etc. Additionally, the memory 3300 may store network configuration information, such as system information, security information (e.g., passwords, tokens, etc.), etc., for communicating with the online service, the client device 130 and/or the server 2000, etc., accessing a wireless network, accessing a wired network, etc., but the example embodiments are not limited thereto.

For example, a user associated with the user device 3000 may access services and/or functionality provided by the online service, such as viewing and/or posting content on social media services and/or streaming media services, performing online banking and/or trading transactions on online financial services, making online purchases on e-commerce platforms, playing online games on gaming services, chatting on online messaging services, performing searches on search engines, etc., via the data network 120 and the client device 130. Moreover, the user may receive and/or use a GUI using a software application (e.g., an app, etc.) corresponding to the online service installed in the memory 3300 of the user device 3000, and/or view the GUI as part of a website corresponding to the online service and accessed using a web browser installed in the memory 3300 of the user device 3000, etc., but the example embodiments are not limited thereto. The graphical user interfaces according to some example embodiments will be discussed in further detail in connection with FIGS. 8A to 8D.

In at least one example embodiment, the at least one communication bus 3200 may enable communication and/or data transmission to be performed between elements of the user device 3000. The bus 3200 may be implemented using a high-speed serial bus, a parallel bus, and/or any other appropriate communication technology. According to some example embodiments, the user device 3000 may include a plurality of communication buses (not shown).

The user device 3000 may also include at least one network interface 3400. According to some example embodiments, the network interface 3400 may be a wired communication interface, such as an Ethernet interface, a USB interface, a coaxial interface, etc., but is not limited thereto. The at least one network interface 3400 may be used to access the data network 120, but is not limited thereto. Additionally, the user device 3000 may also include at least one wireless antenna panel 3500. The at least one wireless antenna panel 3500 may include an associated radio unit (not shown) and may be used to transmit and/or receive wireless signals in accordance with at least one desired radio access technology, such as 4G LTE, 5G NR, Wi-Fi, Bluetooth, NFC, etc.

While FIG. 3 depicts an example embodiment of a user device 3000, the user device is not limited thereto, and may include additional and/or alternative architectures that may be suitable for the purposes demonstrated.

Figure 4:
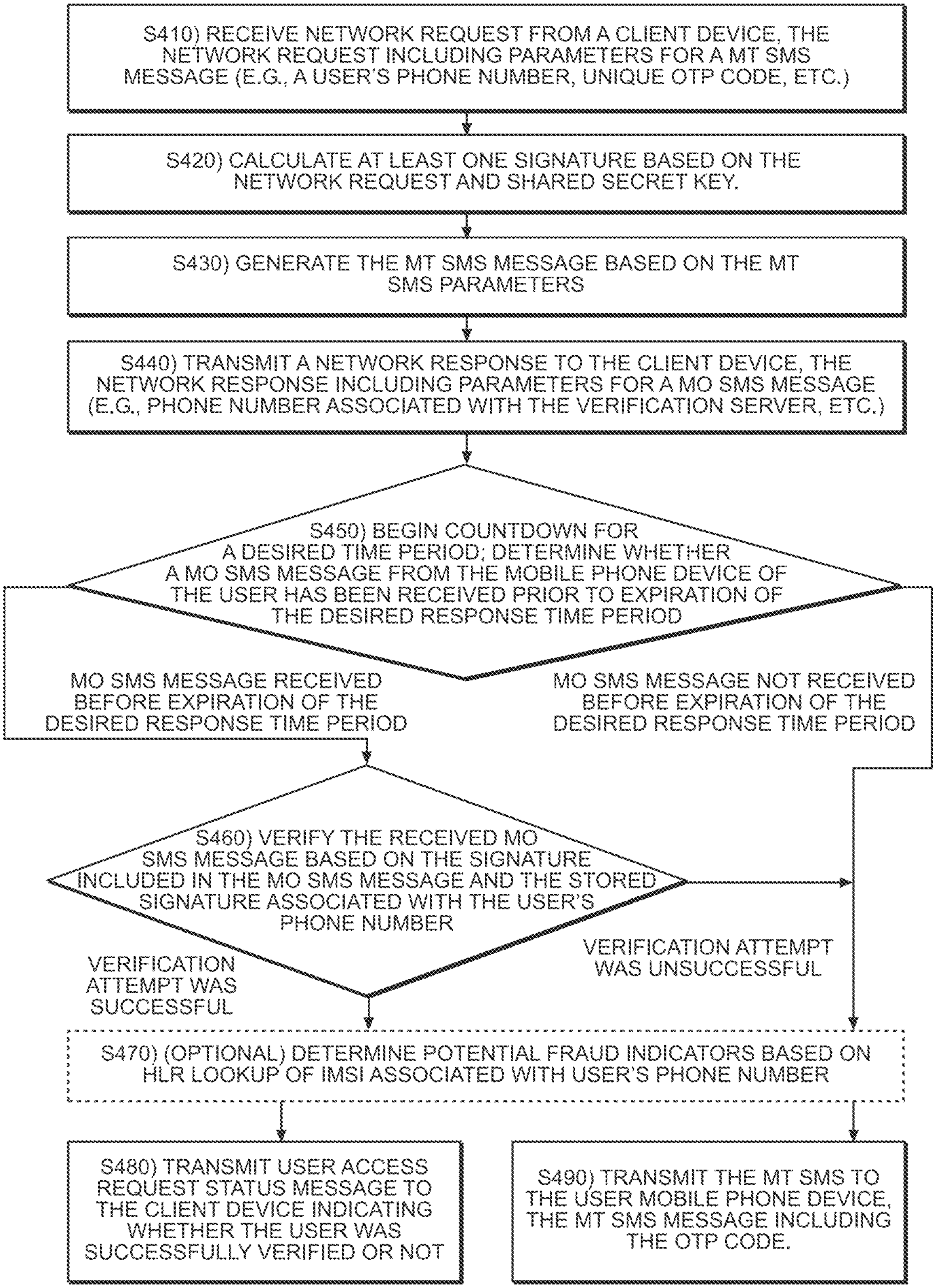
FIG. 4 illustrates a method for operating an authentication/verification server according to at least one example embodiment.

FIG. 4 illustrates a method for operating an authentication/verification server according to at least one example embodiment. According to some example embodiments, the authentication/verification server of FIGS. 4 to 7C may correspond to the authentication/verification server 140 of FIG. 1, the client device of FIGS. 4 to 7C may correspond to the client device 130 of FIG. 1, the user device of FIGS. 4 to 7C may correspond to one or more of the user devices 110 to 113, etc., of FIG. 1, but the example embodiments are not limited thereto, and the authentication/verification server, the client device, and/or user device(s) may have alternative architectures, etc. Additionally, while the example embodiments discussed below discuss the authentication/verification method as employing a user's mobile phone number (e.g., cellular phone number, etc.) for user authentication and/or verification, the example embodiments are not limited thereto, and for example, other communication account identifying information related to the user may be used, such as a public switched telephone network (PSTN) phone number associated with the user, a virtual phone number associated with the user, a proxy phone number rented by the user from an authentication/verification service associated with the authentication/verification server 140, a token associated with the user, an email address associated with the user, an instant messaging account username associated with the user, a social media account username associated with the user, a chat account username associated with the user, other online usernames/handles associated with the user, etc., or any combinations thereof. For example, if the user rents a proxy phone number from the verification/authentication server and/or client device, the user may be assigned a phone number with, e.g., an unassigned country calling code, such as "+999", etc., but the example embodiments are not limited thereto.

Referring now to FIG. 4, in at least one example embodiment, in operation S410 an authentication/verification server may receive at least one network request for authentication and/or verification of a user's credentials from a client device associated with an online service. The authentication and/or verification network request may be transmitted by the client device 130 as a HTTP(s) or SMPP(s) network request to the authentication/verification server 140 in response to a new user account registration request from a user of the online service, a user log-in attempt on the online service, an online transaction attempt on the online service, a new user device log-in attempt on the online service, a log-in attempt at a new geographical location, a new support request with the online service, adding or editing personal account information (e.g., contact information, profile information, etc.) with the online service, a user password reset request associated with a registered user account on the online service, and/or general user actions on the online service, etc., but the example embodiments are not limited thereto. The network request may include parameters for use in generating a mobile-terminated (MT) SMS message to be sent to a user device associated with the user, but the example embodiments are not limited thereto. The MT message refers to a mobile (e.g., cellular, etc.) message that is delivered to a mobile device (e.g., mobile phone 110, a smartphone, etc.), and is in contrast to a mobile-originated (MO) message which is a message that originates and/or is transmitted from a mobile device.

For example, one or more of the MT SMS message parameters may be used for authenticating and/or verifying a user device associated with the user (e.g., a user device identified by the user in the new user registration request submitted to the client device 130, a user device previously registered with the client device 130, etc.), such as message recipient information associated with the user device associated with the user (e.g., the user device's mobile phone number, a proxy phone number associated with the user provided by the authentication/verification server 140, an email address associated with the user, an instant messaging account username associated with the user, a social media account, etc.). According to some example embodiments, the user may register with, rent from, and/or otherwise obtain a proxy phone number associated with the user from the authentication/verification server 140 after the user has previously successfully authenticated and/or verified his or her mobile phone number with the authentication/verification server 140, etc., but the example embodiments are not limited thereto. The user may submit the proxy phone number to the client service, instead of their actual mobile phone number, for verification and/or authentication purposes, and the authentication/verification server 140 may detect the proxy phone number (e.g., based on the country calling code for the proxy phone number, such as "+999", etc.), and then forward any authentication/verification messages destined for the proxy phone number to the user's actual phone number (and/or other communication account associated with the user, such as the user's email address, instant messing account, social media account, SMS account, app notification, etc.) without the user having to disclose their actual phone number to the client service, thereby providing additional security for the user. Additionally, the proxy number service may provide additional convenience for the user by allowing the user to use a single proxy phone number when the user is associated with multiple phone numbers (e.g., a mobile phone, an office phone, a home phone, a virtual phone number, a VoIP phone number, etc.) and/or communication accounts (e.g., email accounts, instant messaging accounts, social media accounts, SMS accounts, app notifications, etc.), and/or the user has changed their mobile phone number, etc. Additionally, the MT SMS parameters may further include a unique one-time password or PIN (OTP) code generated by the client device 130 in response to the authentication and/or verification request from the user. However, the example embodiments are not limited thereto, and there may be additional and/or optional MT SMS parameters, such as OTP format information (e.g., information and/or metadata indicating the format type of the OTP code to be used to identify and/or extract the OTP code from a message), a timestamp associated with a time at which the client device 130 generated and/or transmitted the network request to the authentication/verification server 140, and/or source address information which may be a numeric value or an alphanumeric value identifying and/or related to the client device 130 and/or the online service, e.g., a phone number associated with the client device 130 (e.g., a local phone number, a national phone number, an international phone number, a toll-free phone number, a mobile phone number, a short code, a long code, a network specific number, and/or shared, dedicated, dynamic, or static versions of the above, etc.), a text identification of the online service's name, an email address associated with the online service/client device 130, a URL associated with the online service/client device 130, an IP address associated with the online service/client device 130, etc. Additionally, the MT SMS parameters may further include a reference identifier (e.g., a client identifier, an online service identifier, etc.), status information (e.g., status callback information), a OTP code validity period to be used to set, change, and/or modify the validity time period for the OTP code, etc., but the example embodiments are not limited thereto. Further, according to some example embodiments, the MT SMS parameters may be included in a message body and/or payload of the network request, but the example embodiments are not limited thereto, and for example, one or more of the MT SMS parameters may be included in a message header of the network request, metadata associated with the network request, may be provided in separate and/or sequential network requests, etc.

According to at least one example embodiment, the client device 130 may transmit the OTP code to the authentication/verification server 140 using a desired and/or predetermined OTP format and the authentication/verification server 140 may use the desired and/or predetermined OTP format to extract the OTP code from the network request. However, the example embodiments are not limited thereto, and in some example embodiments, the client device 130 may transmit the OTP code in a new and/or custom OTP format and may include information to allow the authentication/verification server 140 to extract the OTP code from the network request. For example, the OTP format information may include a regular expression (e.g., regex) which allows the authentication/verification server 140 to extract the OTP code from the text of the network request, etc., but the example embodiments are not limited thereto.

In operation S420, the authentication/verification server 140 may calculate and/or generate at least one signature for use during the user's authentication and/or verification request based on the MT SMS parameters received from the client device 130 and a secret key (e.g., an encryption key, etc.) which is shared between the authentication/verification server 140 and the client device 130. The shared secret key may be used by both the client device 130 and the authentication/verification server 140 for use by each entity to calculate a signature associated with the user's authentication and/or verification access attempt. The authentication/verification server 140 may store a plurality of shared secret keys, and each of the shared secret keys may be uniquely shared with a particular online service and/or client device 130, such that a same secret key is not used for more than one online service and/or more than one client device 130, etc.

For example, the authentication/verification server 140 calculate and/or generate a signature associated with the user based on the MT SMS parameters and the shared secret key. More specifically, according to some example embodiments, the authentication/verification server 140 may calculate a keyed-hash signature using a desired and/or predetermined hash function (e.g., SHA1 hash function, HMAC-SHA256 hash function, MD5 hash function, etc.), wherein one or more of the MT SMS parameters included in the network request (e.g., the message recipient information, the OTP code, the timestamp, the source address information, etc.) may be used as the data for the hash function, and the shared secret key may be used as the key for the hash function. Further, according to at least one example embodiment, the client device 130 may also generate a signature associated with the user in response to transmitting the network request to the authentication/verification server 140, and the authentication/verification server 140 and the client device 130 may each store an identical signature associated with the user's access and/or registration attempt without transmitting the signature over a network, thereby decreasing the probability that the signature is exposed and/or intercepted by a malicious actor. According to some example embodiments, the signature may be associated with the user's personal information, the user's phone number, the user's unique identifier on the online service, the user's username, etc., but the example embodiments are not limited thereto.

In operation S430, according to at least one example embodiment, the authentication/verification server 140 may generate the MT SMS message based on the MT SMS parameters (e.g., the message recipient information, the OTP code, the timestamp, the source address information, etc.) and store the generated MT SMS message in memory for a first desired period of time (e.g., for a delay period, etc.). In other words, the authentication/verification server 140 does not immediately transmit the MT SMS message to the user's communication account identifying information (e.g., mobile phone number, etc.) included in the message recipient information, but instead delays the transmission of the MT SMS message until the expiration of the desired period of time, but the example embodiments are not limited thereto. In the event that the user is using a proxy phone number as the communication account identifying information, the authentication/verification server 140 delays transmission of the MT SMS message to the user's actual mobile phone number, etc.

In operation S440, the authentication/verification server 140 may transmit at least one network response to the client device 130. The network response may include message parameters for a MO SMS message to be automatically generated by the user device associated with the user, such as user device 110, etc. The MO SMS message parameters may include parameters such as the message recipient information, the signature, the timestamp, the source address information, etc., but the example embodiments are not limited thereto. Additionally, the MO SMS message may further include optional parameters, such as one or more shared, dedicated, dynamic and/or static phone numbers (e.g., local, national, international, toll-free, mobile, short code, long code, network specific number) associated with the authentication/verification server 140 which may be used as the message recipient field of the MO SMS message. In other example embodiments, the MO SMS message may optionally further include one or more shared, dedicated, dynamic and/or static phone numbers associated with the client device 130 which may be used as the message recipient field of the MO SMS message instead of the phone number associated with the authentication/verification server 140, but the example embodiments are not limited thereto. Additionally, according to some example embodiments, the phone numbers for the authentication/verification server 140 and/or the phone numbers of the client device 130 may previously have been stored in the memory of the client device 130 and/or separately transmitted to the client device 130, and therefore these phone numbers may be omitted from the MO SMS parameters, etc., but the example embodiments are not limited thereto. The generation (and/or auto-generation) of the MO SMS message and the transmission of the MO SMS message from the user's mobile phone 110 will be discussed in further detail in connection with FIGS. 5 to 7C.

In operation S450, the authentication/verification server 140 may begin a countdown for a second desired period of time (e.g., a desired response time period, etc.). The second desired period of time may be the same period of time as the first desired period of time used to delay the transmission of the MT SMS message to the user device 100 as referenced in operation S430, or may be a second desired period of time which may be of equal length or greater than the first desired period of time, but the example embodiments are not limited thereto. During the second desired period of time the authentication/verification server 140 may determine whether a MO SMS message has been received from the mobile phone 110 associated with the user's mobile phone number (and/or proxy phone number associated with the user, etc.) received in the network request of operation S410.

In response to the authentication/verification server 140 determining that the MO SMS message has been received before the expiration of the second desired period of time, in operation S460, the authentication/verification server 140 may verify the received MO SMS message. More specifically, the authentication/verification server 140 may receive the MO SMS message directly from the user's mobile phone 110 associated with the user's mobile phone number (and/or the user's proxy phone number, etc.) received in the network request of operation S410, or may be forwarded a copy of the MO SMS message from the client device 130 based on whether the client device 130 used a phone number associated with the authentication/verification server 140 or the client device 130 in the message recipient field of the MO SMS message. Further, the authentication/verification server 140 may determine whether the MO SMS message contains a signature, and in response to the MO SMS message containing a signature, the authentication/verification server 140 will verify whether the received signature matches the previously generated signature associated with the user's phone number (e.g., the signature calculated in operation S420). Additionally, according to some example embodiments, the authentication/verification server 140 may compare a timestamp associated with the previously calculated signature with a current time to determine whether the time difference indicates that the previously calculated signature has expired, thereby ensuring that previously signatures may be not be re-used by malicious actors.

In the event that the authentication/verification server 140 successfully verifies the signature included in the MO SMS message, the authentication/verification server 140 may cancel the transmission of the delayed MT SMS message.

Additionally, in optional operation S470, the authentication/verification server 140 may determine potential fraud indicators associated with the user's MO SMS message by performing a home location register (HLR) lookup using the user's mobile phone number on the cellular network 125 to determine the international mobile subscriber identity (IMSI) code registered with the user's mobile phone number on the cellular network 125. The authentication/verification server 140 then compares the IMSI code registered with the cellular network 125 with any previously determined IMSIs for the same phone number. If the IMSI codes match, then the authentication/verification server 140 may determine that there is no fraud indicators associated with the user's phone number. However, if the IMSI codes do not match, then the authentication/verification server 140 may determine that there are fraud indicators associated with the user's phone number, or in other words, the SIM card associated with the user's phone number was likely cloned (e.g., involved in a SIM card cloning, etc.), and that there is an increased likelihood of the user's access attempt being fraudulent and/or malicious, etc. According to some example embodiments, in the event that the user uses a proxy phone number for the authentication/verification attempt, the authentication/verification server 140 may lookup the user's pre-registered actual mobile phone number associated with the proxy phone number and performs the HLR lookup using the actual mobile phone number, but the example embodiments are not limited thereto.

In operation S480, the authentication/verification server 140 may transmit a user access request status message to the client device 130. The user access request status message may indicate the results of the verification performed in operation S460 (e.g., whether the signature verification was successful or unsuccessful) and, optionally, whether potential fraud indicators were detected based on the HLR lookup of the IMSI code, but the example embodiments are not limited thereto.

Referring again to operation S450, in response to no MO SMS message being received before the expiration of the second desired time period (e.g., the desired response time period), the authentication/verification server 140 may proceed to operation S490 and transmit the delayed MT SMS message to the user mobile phone 110, the MT SMS message including the OTP code generated by the client device 130 in the message body, but not limited thereto. The MT SMS message will be discussed in greater detail in connection with FIGS. 6 to 8D.

Alternatively, in response to the signature verification attempt being unsuccessful in operation S460, the authentication/verification server 140 may proceed to optional operation S470 and determine potential fraud indicators of the MO SMS message based on a HLR lookup of the user's mobile phone number. In the event that the authentication/verification server 140 determines that there are potential fraud indictors in the received MO SMS message, the authentication/verification server 140 may cancel the transmission of the MT SMS message to the user mobile phone 110, and may instead transmit a user access attempt request status message to the client device 130 indicating that the user access attempt is likely fraudulent and/or malicious, etc., but the example embodiments are not limited thereto. Otherwise, if the authentication/verification server 140 determines that there are no potential fraud indicators in optional operation S470, the authentication/verification server 140 will proceed to operation S490 and transmit the MT SMS message to the user's mobile phone 110, etc.

Figure 5:
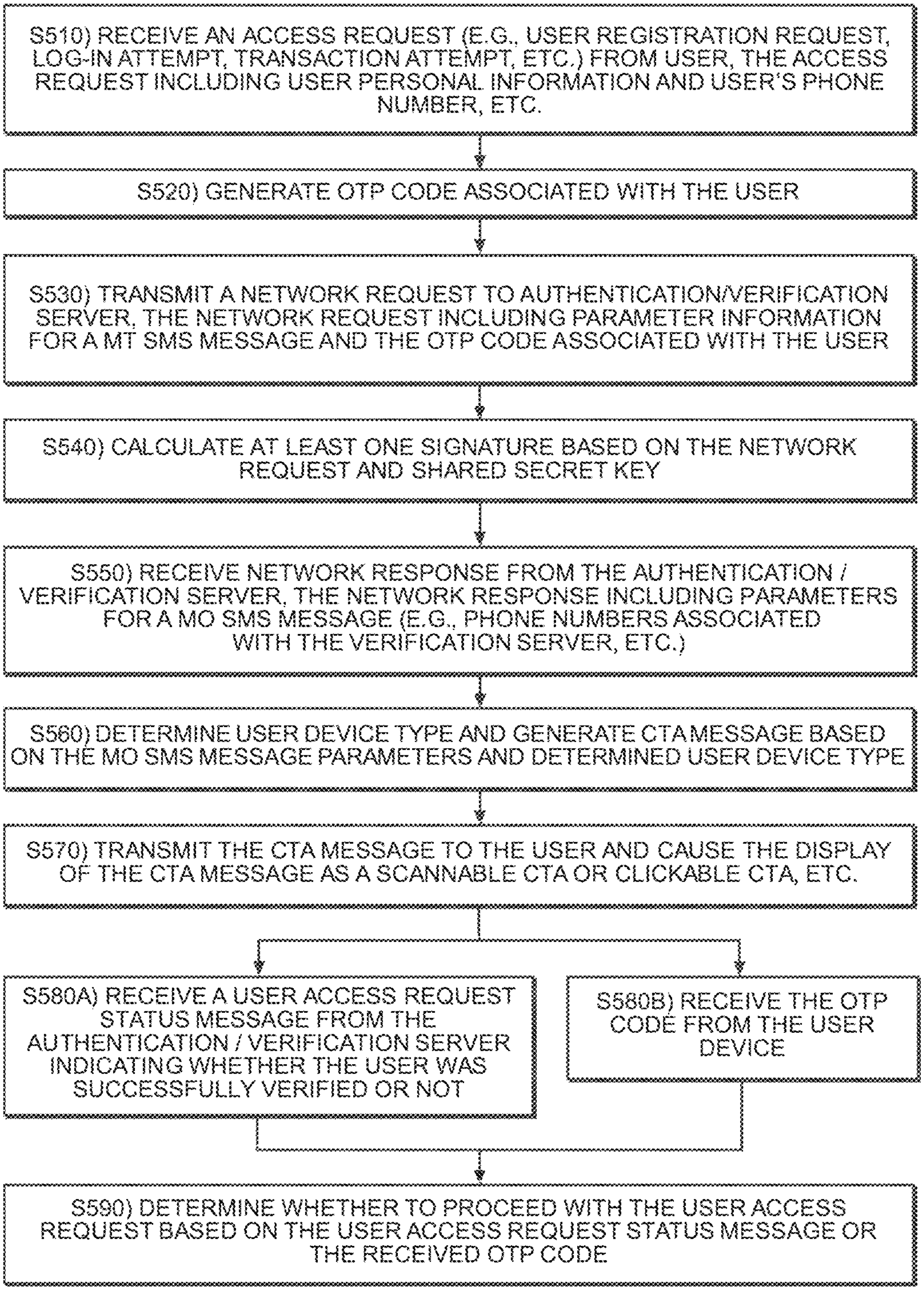
FIG. 5 illustrates a method for a client device according to some example embodiments.

FIG. 5 illustrates a method for a client device according to some example embodiments.

According to at least one example embodiment, in operation S510, a client device 130 may receive a user access request for the online service associated with the client device 130, such as a user registration request, a user log-in attempt, an online transaction attempt, a password reset request, etc., from a user. Additionally, according to some example embodiments, the user access request may include personal information associated with the user, such as the user's birthday, social security number, mailing address, mobile phone number, email address, instant messaging service username, etc., or any combinations thereof, but the example embodiments are not limited thereto.

In operation S520, the client device 130 may generate an OTP code associated with the user and/or the user access request. For example, the OTP code may be uniquely generated using a random number generator, a pseudo-random number generator, a hashing algorithm, etc., but the example embodiments are not limited thereto. In operation S530, the client device 130 may transmit a network request (e.g., a user authentication/verification network request) to the authentication/verification server 140. The network request may include MT SMS parameters for use in generating a MT SMS message in response to the user access attempt. As discussed with regards to operation S410, the MT SMS parameters may include message recipient information associated with the user device associated with the user (e.g., the user device's mobile phone number, a proxy phone number associated with the user, an email address associated with the user, an instant messaging account username associated with the user, etc.), the OTP code generated by the client device 130 in operation S520, etc. However, the example embodiments are not limited thereto, and the MT SMS parameters may additionally and/or optionally include parameters such as a timestamp associated with a time at which the client device 130 generated and/or transmitted the network request to the authentication/verification server 140, source address information which may be a numeric value or an alphanumeric value identifying and/or related to the client device 130 and/or the online service, e.g., a phone number associated with the client device 130, a text identification of the online service's name, an email address associated with the online service/client device 130, a URL associated with the online service/client device 130, etc., but the example embodiments are not limited thereto.

Similar to operation S420, in operation S540, the client device 130 may calculate at least one signature based on the MT SMS parameters and a secret key shared with the authentication/verification server 140 stored in the memory of the client device 130. As discussed in FIG. 4, the at least one signature is associated with the user's mobile phone number included in the user access attempt and the signature generated by the client device 130 must be identical to the signature generated by the authentication/verification server 140, but the example embodiments are not limited thereto.

In operation S550, the client device 130 may receive a network response from the authentication/verification server 140 in response to the authentication/verification network request. As discussed in connection to operation S440, the network response may include MO SMS parameters to be used to automatically generate a MO SMS message on the user's mobile phone device, such as the user device 110, etc. The MO SMS message parameters may include parameters such as the message recipient information, the signature, the timestamp, the source address information, etc., but the example embodiments are not limited thereto. Additionally, the MO SMS message may further include optional parameters, such as one or more shared, dedicated, dynamic and/or static phone numbers (e.g., local, national, international, toll-free, mobile, short code, long code, network specific number, etc.) associated with the authentication/verification server 140 which may be used as the message recipient field of the MO SMS message. In other example embodiments, the MO SMS message may optionally further include one or more shared, dedicated, dynamic and/or static phone numbers (e.g., local, national, international, toll-free, mobile, short code, long code, network specific number, etc.) associated with the client device 130 which may be used as the message recipient field of the MO SMS message instead of the phone number associated with the authentication/verification server 140, but the example embodiments are not limited thereto. Additionally, according to some example embodiments, the phone numbers for the authentication/verification server 140 and/or the phone numbers of the client device 130 may previously have been stored in the memory of the client device 130 and/or separately transmitted to the client device 130, and therefore these phone numbers may be omitted from the MO SMS parameters, etc., but the example embodiments are not limited thereto. According to some example embodiments, the client device 130 may select one or more phone numbers (either the phone numbers associated with the client device 130 or the phone numbers associated with the authentication/verification server 140) for inclusion in the MO SMS message parameters as the message recipient field/information (e.g., the message destination information). Moreover, the client device 130 may select a phone number which is in the same area code, same country code, etc., as the user's mobile phone number, and/or select a phone number which does not cause the user to incur a fee or additional charge for transmitting the MO SMS message, such as a toll-free number, a short code, a long code, etc., but the example embodiments are not limited thereto.

In operation S560, the client device 130 may determine the device type of the user device used by the user to transmit the user access request (e.g., a primary user device). For example, the client device 130 may determine the user device type of the primary user device by analyzing the "HTTP_USER_AGENT" field included in a HTTP request transmitted between the client device 130 and determine the user device type based on the operating system information included in the user agent field (e.g., whether the operating system information relates to a mobile OS (e.g., iOS, Android, etc.), or a PC OS (e.g., Windows, Linux, MacOS, etc.)), or determine whether the browser information included in the user agent field corresponds to a mobile browser or a PC browser, etc. Further, if the user device is using an app associated with the online service, the app may embed the user device type information of the primary user device in the user access attempt and the client device 130 may extract the user device type information from the user access attempt, etc., but the example embodiments are not limited thereto, and other methods of determining the user device type may be used.

Additionally, according to some example embodiments, the client device 130 may generate a call-to-action (CTA) message for the primary user device used by the user to transmit the user access request based on the determined user device type and the MO SMS message parameters. More specifically, in response to the client device 130 determining that the user is using a non-cellular primary user device, e.g., a PC, a laptop, a non-cellular enabled tablet, etc., to transmit the user access request, then the client device 130 will generate a first type of CTA message which includes the MO SMS message parameters, but is not limited thereto. According to some example embodiments, the first type of CTA message may be a scannable CTA and may include a barcode, a quick response (QR) code, an image, and/or some other visual element, which includes the MO SMS message parameters as embedded information. When the user uses a cellular enabled secondary user device (e.g., the mobile phone 110, a cellular enabled tablet, a cellular enabled smartwatch, etc.), to scan and/or otherwise capture an image of the scannable CTA using the secondary user device's camera and/or other image sensor, the scannable CTA causes the secondary user device to automatically open a messaging application, e.g., a SMS messaging application, etc., and automatically generate, compose, and/or populate a new SMS message with the MO SMS message parameters, etc., but the example embodiments are not limited thereto. The first type of CTA message will be discussed in greater detail in connection with FIG. 8A.

In response to the client device 130 determining that the user is using a mobile phone and/or other cellular enabled primary user device (e.g., a cellular enabled tablet, cellular enabled smartwatch, etc.) to transmit the user access request, the client device 130 will generate a second type of CTA message which includes the MO SMS message parameters, but is not limited thereto. According to some example embodiments, the second type of CTA message may be a clickable CTA and may include a button, a hyperlink, etc., which may cause the mobile phone and/or cellular enabled user device to automatically open a messaging application, e.g., a SMS messaging application, etc., and automatically generate, compose, and/or populate a new SMS message with the MO SMS message parameters, etc., but the example embodiments are not limited thereto. The second type of CTA message will be discussed in greater detail in connection with FIG. 8B.

Next in operation S570, the client device 130 may transmit the CTA message to the primary user device (e.g., the user device used to transmit the user access attempt) and cause the CTA message to be displayed on the display of the primary user device. In the event that the primary user device is a PC or other non-cellular enabled user device, the scannable CTA message is displayed on the display of the PC so that the user may use his or her secondary user device (e.g., the user's mobile phone 110, etc.) to scan the scannable CTA message and automatically generate and/or compose the MO SMS message, etc. In the event that the primary user device is a mobile phone or other cellular enabled user device, the clickable CTA message is displayed on the mobile phone, etc., and the user may click on the clickable CTA to automatically generate and/or compose the MO SMS message, etc. Additionally, both types of CTA messages will further include a countdown timer display which corresponds to the desired response time period and/or second desired time period of operation S450, etc., and indicates to the user how much time is remaining for the user to scan or click on the CTA message and transmit the automatically generated and/or composed MO SMS message to the authentication/verification server 140 or the client device 130, etc.

In operation S580A, in the event that the message recipient field of the MO SMS message includes a phone number (e.g., a static or dynamic phone number owned or rented by the client online service, a shared phone number, a proxy phone number, a SMS "short code," a SMS "long code," etc.) associated with the client device 130, the client device 130 may receive the MO SMS message from the user's mobile phone 110 (and/or cellular enabled user device, etc.). If this is the case, the client device 130 will forward the received MO SMS message to the authentication/verification server 140 for processing as discussed in operations S450 to S490. Otherwise, the client device 130 will receive a user access request status message from the authentication/verification server 140, the status message indicating whether the user was successfully verified or not, or in other words, whether the MO SMS message was received by the authentication/verification server 140 before the desired response time period expired, the signature included in the MO SMS message was successfully verified, and/or potential fraud indicators, etc.

In operation S580B, in the event that the user (intentionally or unintentionally) does not transmit the MO SMS message within the desired response time period, the client device 130 may alternatively receive the OTP code from the user device in response to the authentication/verification server 140 transmitting the MT SMS message to the user's mobile phone and/or other cellular-enabled device.

According to some example embodiments, in operation S590, the client device 130 may determine whether to proceed with the user access request based on the results of either operation S580A and/or S580B. More specifically, the client device 130 may determine whether either operations S580A and/or S580B was completed successfully, e.g., the MO SMS message was successfully verified by the authentication/verification server 140 and/or the client device 130 successfully received the OTP code from the user, etc., and if either the operations S580A and/or S580B were completed successfully, the client device 130 may allow the user access request to proceed.

However, in the event that neither operations S580A nor S580B were completed successfully, then the client device 130 may prohibit and/or cancel the user access request. Further, according to some example embodiments, fraud prevention actions may be performed, such as requiring additional verification information from the user, such as submission of a photo ID (e.g., a driver's license, a passport, and/or other governmental ID), flagging and/or locking the associated user account, prohibiting the creation of new user accounts using the same mobile phone number and/or user personal information, transmitting a potential fraud warning message to a secondary point of contact for the user account, etc., but the example embodiments are not limited thereto.

Figure 6:
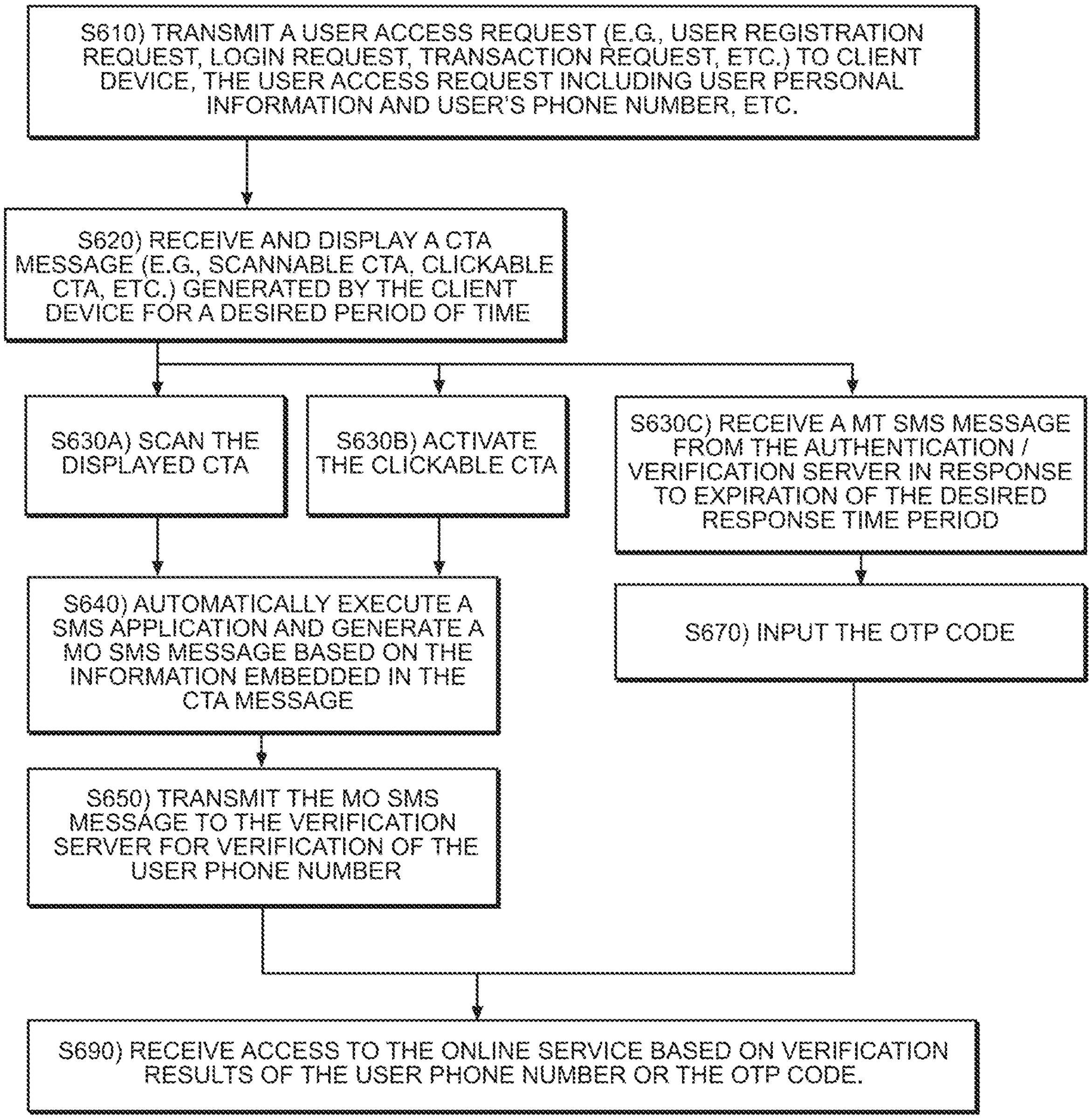
FIG. 6 illustrates a method for operating a user device according to some example embodiments.
Figure 8A:
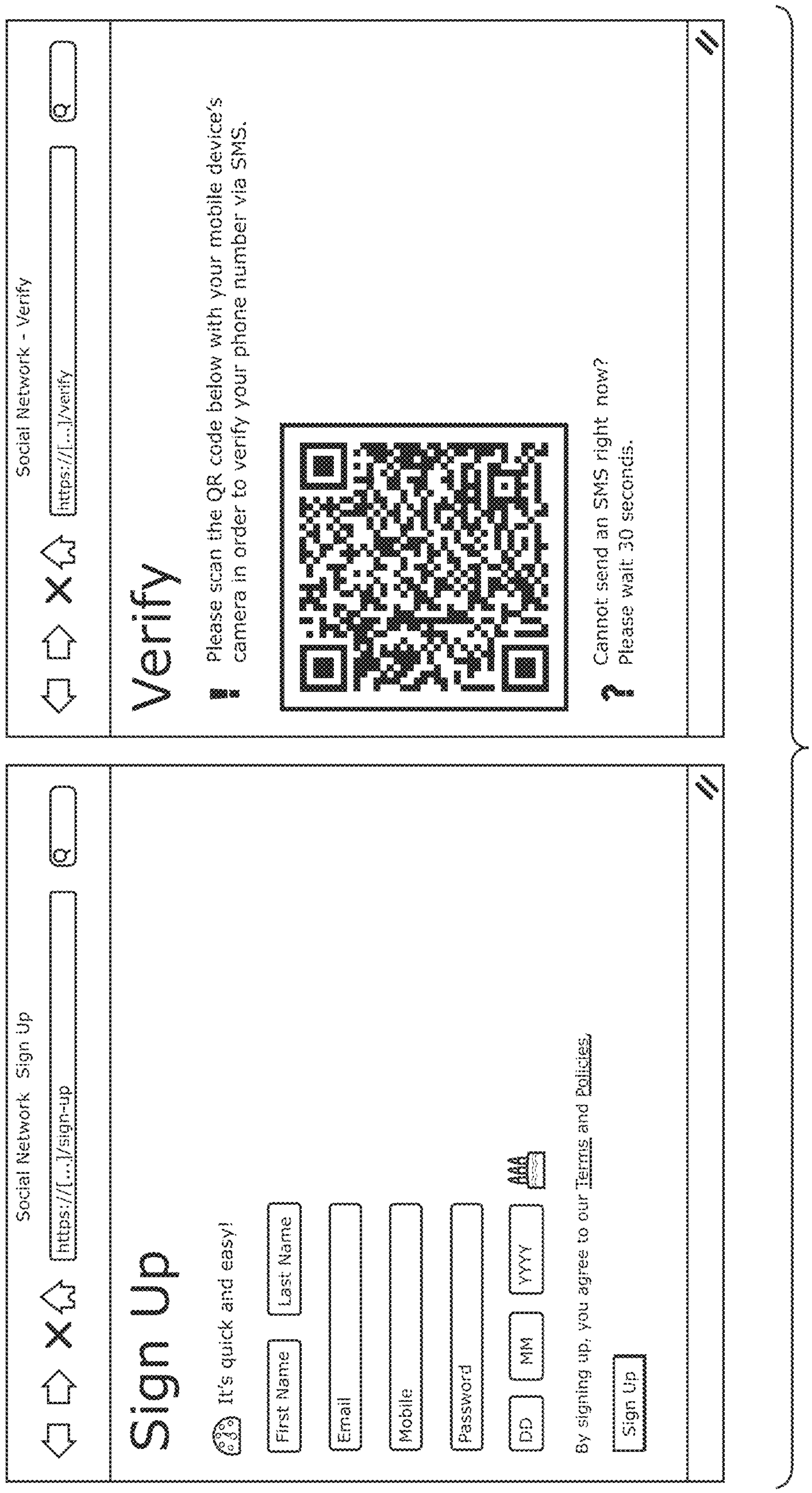
FIGS. 8A to 8D illustrate example graphical user interfaces according to some example embodiments.
Figure 8B:
Figure 8C:
Figure 8D:
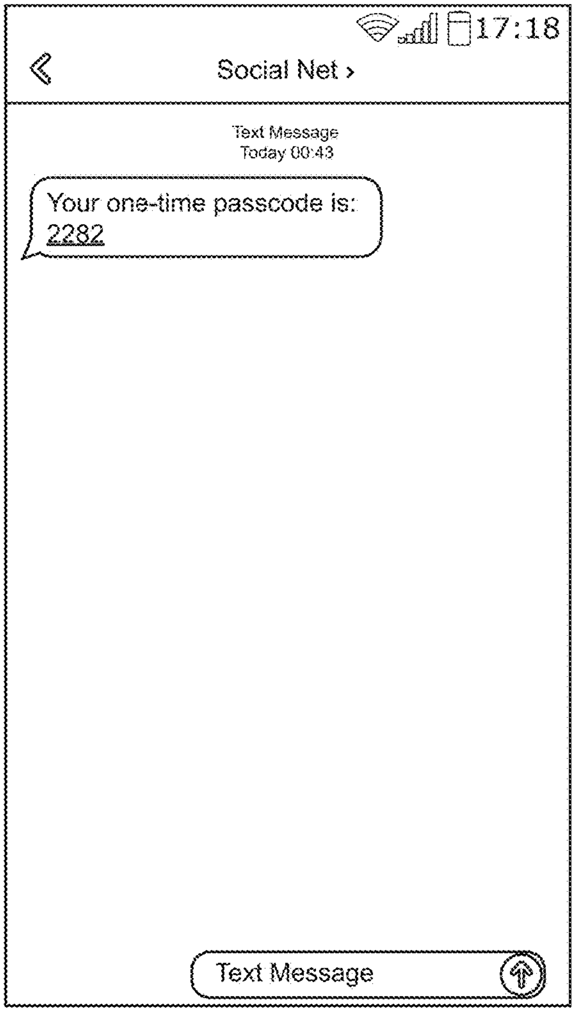

FIG. 6 illustrates a method for operating a user device according to some example embodiments. FIGS. 8A to 8D illustrate example graphical user interfaces according to some example embodiments. More specifically, FIG. 8A illustrates an example new user account registration GUI and call-to-action message viewed using a web browser according to at least one example embodiment, FIG. 8B illustrates an example new user account registration GUI and call-to-action message viewed using a mobile phone according to at least one example embodiment, FIG. 8C illustrates an example auto-generated SMS message according to at least one example embodiment, and FIG. 8D illustrates an example MT SMS message according to at least one example embodiment.

Referring now to FIGS. 6 and 8A to 8C, a user may use a primary user device (e.g., any one of user devices 111 to 113, etc.) to transmit a user access request to a client device 130 associated with an online service. The user access request may be at least one of a new user account registration request, a user login request, an online transaction request, a password reset request, etc., but the example embodiments are not limited thereto. As illustrated in FIGS. 8A and 8B, the user access request may include the input of the user's personal information, such as the user's real name, email address, mobile phone number, proxy phone number, password, birthdate, etc., but the example embodiments are not limited thereto. Additionally, according to some example embodiments, the user access request may include information related to a device type of the user's primary user device, such as the manufacturer and/or model number of the primary user device, the operating system executing on the primary user device, a web browser information related to the web browser being executed by the primary user device, etc., but the example embodiments are not limited thereto.

In operation S620, the primary user device may receive and display a CTA message generated by the client device 130. The CTA message may be dependent on the device type of the primary user device. For example, if the primary user device is a non-cellular enabled user device and/or a non-phone device, such as a PC, laptop, etc., the primary user device receives a first type of CTA message, e.g., a scannable CTA message, such as the CTA message illustrated in FIG. 8A. The scannable CTA message may include a barcode, QR code, and/or other visual representation which may include MO SMS parameters embedded in the scannable CTA, but the example embodiments are not limited thereto.

Additionally, in operation S630A, the user may scan and/or otherwise capture an image of the scannable CTA using a cellular enabled secondary user device, e.g., the mobile phone associated with the mobile phone number registered with the online service and/or provided in the user access request, etc. Alternatively, in operation S630B, the user may activate the clickable CTA by clicking on a link or button as shown in FIG. 8B. Alternatively, in operation S630C, in response to the desired response time period expiring before the MO SMS message is transmitted to the client device 130 or the authentication/verification server 140, in operation S660, the user's mobile phone and/or other cellular enabled user device may receive a MT SMS message from the authentication/verification server 140 as shown in FIG. 8D. The MT SMS message may include an OTP code generated by the client device 130, but the example embodiments are not limited thereto, and for example, the MT SMS message may further include a link to the website associated with the client device 130, etc.

In operation S640, the scannable CTA and/or the clickable CTA may cause the secondary user device and/or primary device to automatically execute a messaging application (e.g., a SMS messaging application, an email application, an instant messaging application, a social media application, VOIP application, teleconferencing application, videoconferencing application, etc.) stored on the user's mobile phone user (e.g., automatically execute the default SMS messaging application, etc.) and/or the user's primary device (e.g., automatically execute the default email application, instant messaging application, social media application, VOIP application, teleconferencing application, videoconferencing application, etc.). Assuming that the user is using a mobile phone, next, the user's mobile phone may automatically generate, compose and/or populate the fields of a new SMS message using the MO SMS parameters included in and/or embedded in the scannable/clickable CTA message. For example, as shown in FIG. 8C, the mobile phone may extract a phone number associated with the client device 130 or the authentication/verification server 140 from the CTA message and insert the extracted phone number in the message recipient field of the MO SMS message, as well as populate the message body of the MO SMS message with the signature calculated by the client device 130 in operation S540, etc.

Further, according to some example embodiments, the automatically generated MO SMS message is not automatically transmitted to the client device 130 or the authentication/verification server 140. Instead, in operation S650, the user must manually input the command/press a button to transmit the MO SMS message to the client device 130 or the authentication/verification server 140, in order to allow the user to verify the contents of the MO SMS message and the recipient of the MO SMS message, etc., to provide more security and data transparency for the user. However, in other example embodiments, the MO SMS message may be automatically transmitted from the mobile phone, etc.

In operation S670, the user may automatically access and/or manually access the website associated with the client device using a web browser and/or app associated with the online service installed on the user's mobile phone and/or other network enabled user device (e.g., a desktop computer, a tablet, a laptop computer, a gaming console, a smart device, etc.). For example, according to some example embodiments, after the expiration of desired response time period, the user's mobile phone and/or other user device may be caused to automatically redirect to a website associated with the client device 130, and/or automatically display a form for inputting the OTP code, etc. Further, the user may then input the OTP code included in the MT SMS message and/or the OTP code may be automatically input into the website in response to the automatic redirection of the user device and/or the user activating the link included in the MT SMS message, etc., but the example embodiments are not limited thereto.

In operation S690, the user may receive access to the online service from the client device 130 based on verification results of the user's mobile phone number or the successful input of the OTP code into the website associated with the client device. In the event that the user's mobile phone number is not successfully verified or the OTP code is not successfully input into the website, as discussed in greater detail in connection with FIGS. 4 and 5 and 7A to 7C, the user access request may be denied by the client device 130. Further, the user may receive a user access status message from the client device 130 via the user device indicating that the user access request is denied and/or requesting the completion of one or more fraud prevention actions, etc.

Figure 7A:
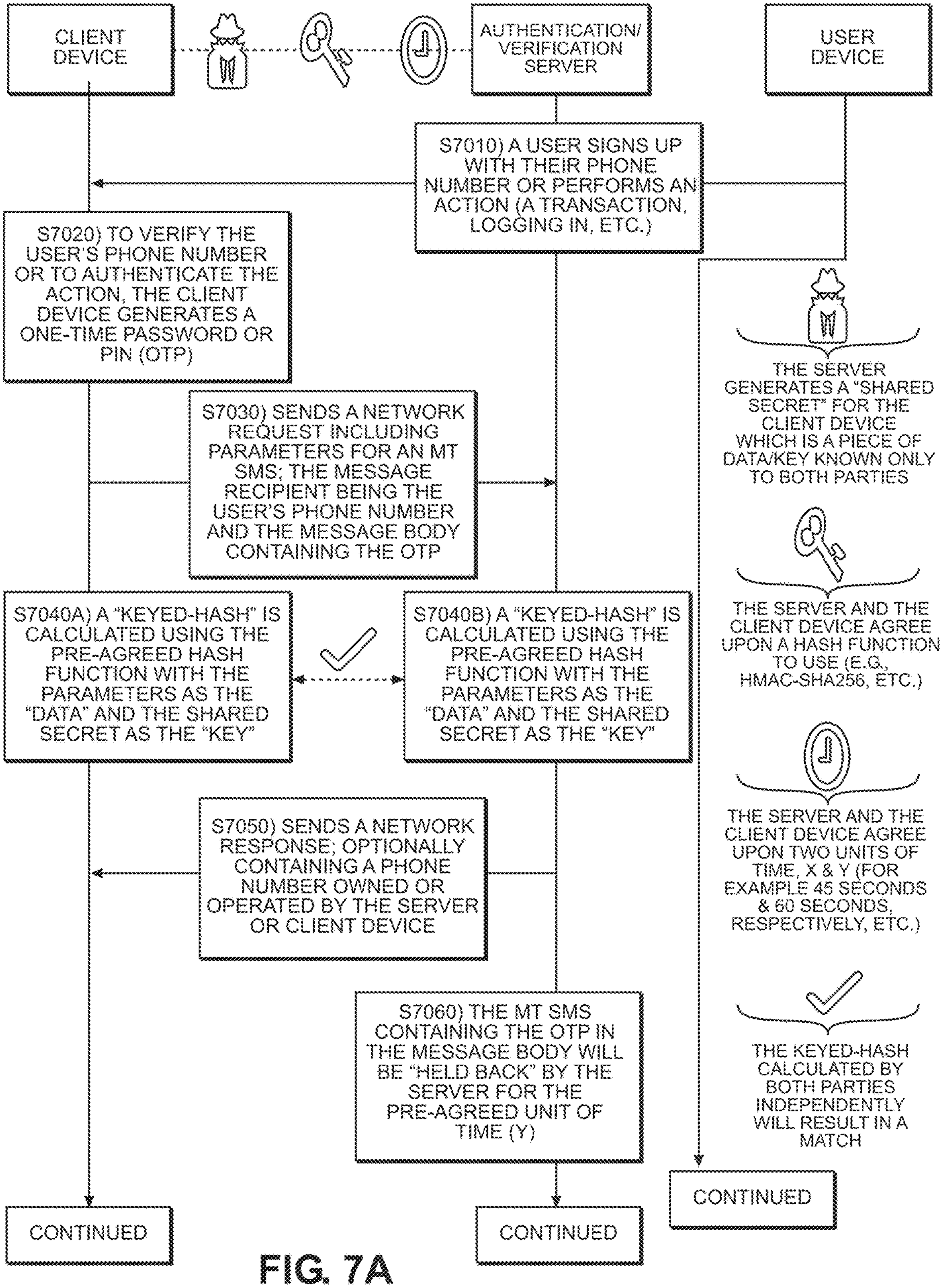
FIGS. 7A to 7C illustrate a transmission flow diagram corresponding to FIGS. 4 to 6 according to some example embodiments.
Figure 7B:
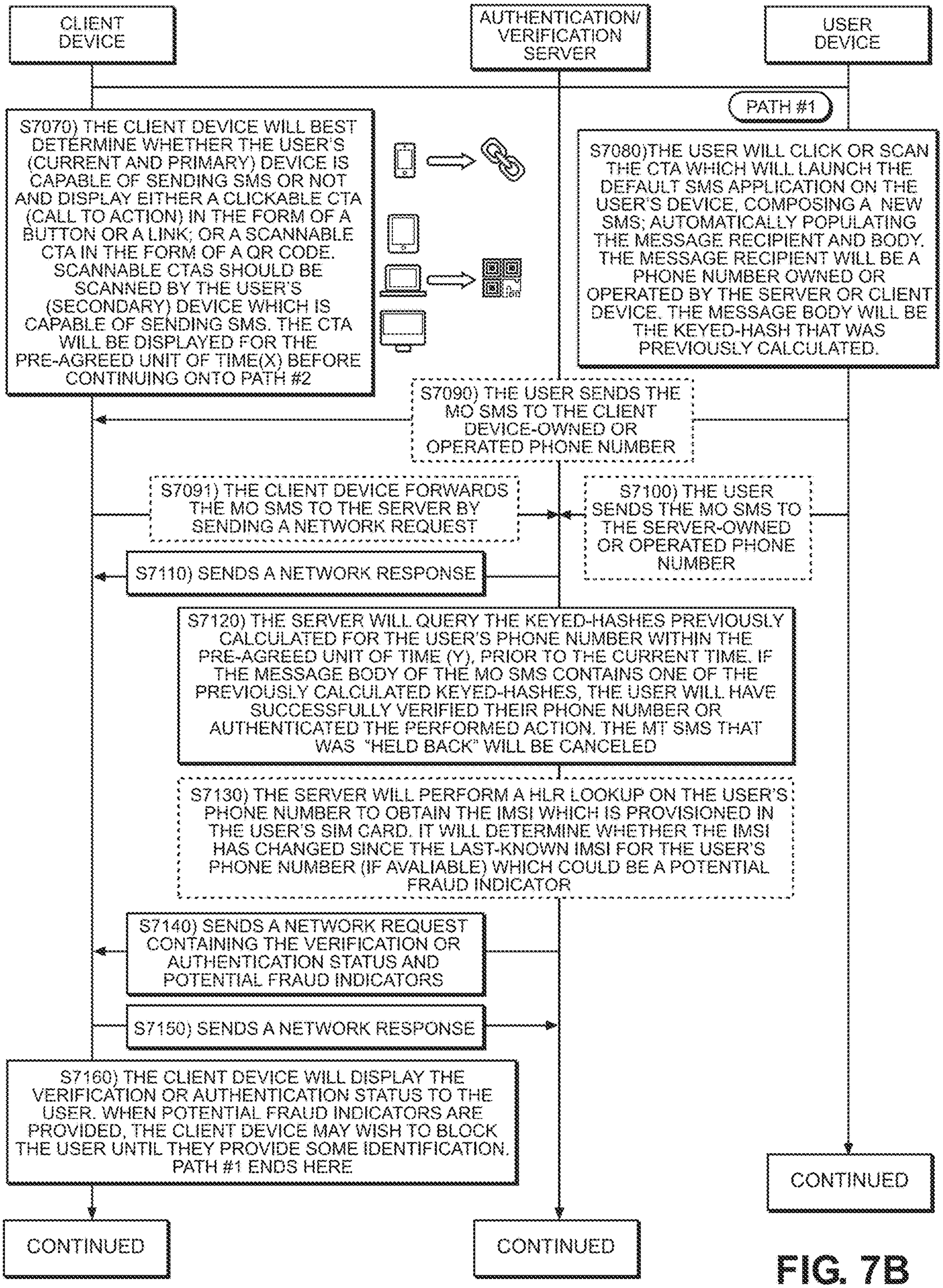
Figure 7C:
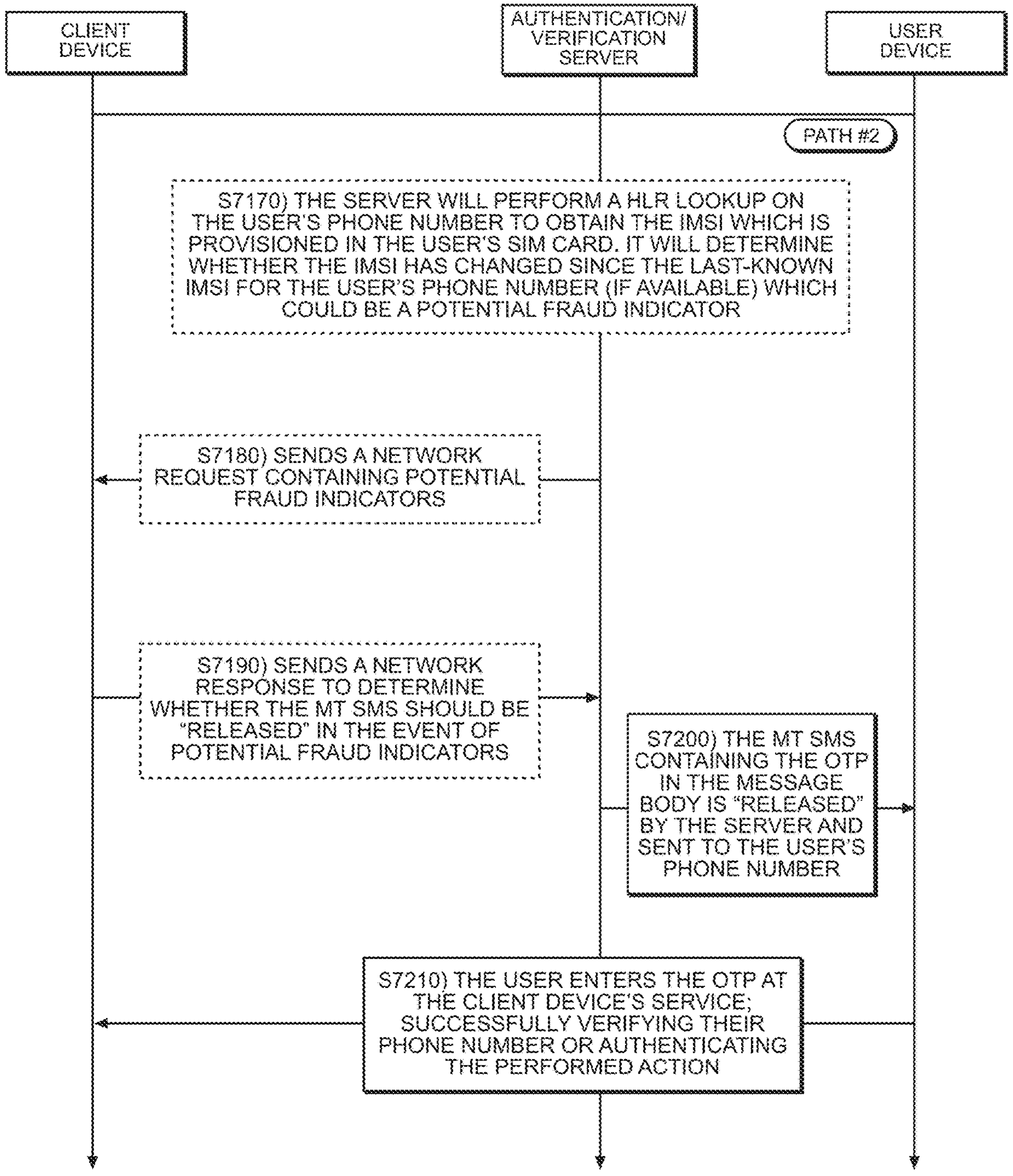

FIGS. 7A to 7C illustrate a transmission flow diagram corresponding to FIGS. 4 to 6 according to some example embodiments.

Referring now to FIG. 7A, in operation S7010, a user device, such as any one of user devices 111 to 113, etc., may transmit an online access request for an online service associated with the client device 130, such as a new user sign up request, a user log-in attempt, an online transaction attempt, a password reset request, etc.

In operation S7020, the client device 130 may generate an OTP code associated with the user in response to the received online access request to use for verifying a phone number associated with the user. In operation S7030, the client device 130 may transmit a network request to the authentication/verification server 140, the network request including one or more parameters for an MT SMS message to be transmitted to the user's phone number. As discussed previously for operation S530, the network request may further include the message recipient information (e.g., the user's phone number, etc.), and a message body to be included in the MT SMS message, etc., but the example embodiments are not limited thereto. The message body may further include the generated OTP code, etc.

In operations S7040A and S7040B, both the client device 130 and the authentication/verification server 140 may calculate, generate, and/or determine a signature (e.g., a keyed-hash, etc.) based on the network request and a shared secret key. The shared secret key may be a key which is shared and/or previously stored by the client device 130 and the authentication/verification server 140. The signature may be generated by the client device 130 and the authentication/verification server 140 using a desired and/or pre-greed upon hash function, such as a SHA1 hash function, a HMAC-SHA256 hash function, a MD5 hash function, etc., but the example embodiments are not limited thereto. In at least one example embodiment, the message body and/or the MT SMS message parameters may be used as the "data" for the hash function, and the shared secret key may be used as the "key" for the hash function, but the example embodiments are not limited thereto. Additionally, according to some example embodiments, the client device 130 and the authentication/verification server 140 may generate the signatures simultaneously and/or at different times. Because the client device 130 and the authentication/verification server 140 use the same hash function, same values for the data, and the same shared secret key to generate the signature, both the client device 130 and the authentication/verification server 140 will generate the same signature. Consequently, the security of the authentication and/or verification operation of the user is increased because the generated signature is not transmitted between the client device 130 and the authentication/verification server 140 for each authentication and/or verification attempt.

In operation S7050, the authentication/verification server 140 transmits a network response to the client device 130 including parameters for a MO SMS message. The MO SMS message parameters may optionally include a phone number (e.g., a static or dynamic phone number, a SMS short code, a SMS long code, etc.) associated with (e.g., rented by, operated by, and/or owned by, etc.) the authentication/verification server 140, such as a local, national, mobile, and/or toll-free phone number, a SMS short code, a SMS long code, etc., selected based on the message recipient information (e.g., the user's mobile phone number, etc.), but the example embodiments are not limited thereto. For example, if the user's mobile phone number indicates that the user's mobile phone is a phone number from the U.S.A., the authentication/verification server 140 may select an appropriate U.S.A. phone number associated with the authentication/verification server 140, so that the user and/or the online service does not have to incur fees associated with the transmission and/or reception of any SMS messages, but the example embodiments are not limited thereto. Additionally, according to some example embodiments, the phone number associated with the authentication/verification server 140 may further be (and/or may also include) a SMS "short code" and/or a SMS "long code" number associated with the authentication/verification server 140. The SMS short code may be a shared or dedicated 5- or 6-digit code generated by and/or registered with a mobile carrier(s) and/or telecommunications company for transmitting and/or receiving SMS messages, and the SMS long code may be a shared or dedicated 7-digit or 10-digit code generated by and/or registered with the mobile carrier(s) and/or telecommunications company for transmitting and/or receiving SMS messages which resembles a standard phone number, but the example embodiments are not limited thereto, and for example the short codes or long codes may have differing number of digits based on the rules and regulations of the country, geographic location, and/or telecommunication company, etc. According to some example embodiments, the use of short codes for the MO SMS message increases security and reduces and/or eliminates the chances that the SMS message is spoofed by a malicious actor due to the registration of the short codes with the mobile carrier/telecommunications company.

In operation S7060, the authentication/verification server 140 will delay the transmission of (e.g., hold back) the MT SMS message for a desired period of time (e.g., a countdown time period), or in other words, the authentication/verification server 140 will begin the countdown of a desired period of time upon the generation of the signature associated with the user. If a MO SMS message is not received by the authentication/verification server 140 before the expiration of the desired period of time, then the authentication/verification server 140 will assume that the authentication/verification of the user's mobile phone number has failed.

According to some example embodiments, a first transmission flow path may start with operation S7070. In operation S7070, the client device 130 will determine the device type being used by the user and determine whether the user's current device (e.g., the user's primary device) is capable of sending a SMS message based on the determined device type. In the event that the user's current device is capable of transmitting a SMS message (e.g., the primary device is a mobile phone, etc.), then the client device 130 will transmit a clickable CTA message (e.g., a button, a link, etc.) for display on the user's current device. In the event that the user's current device is not capable of transmitting a SMS message (e.g., the primary device is a desktop computer, a laptop, a tablet, etc.), the client device 130 will transmit a scannable CTA message (e.g., a QR code, a barcode, etc.) for display on the user's current device and to be scanned using the user's secondary device (e.g., the user's mobile phone, etc.), but the example embodiments are not limited thereto. In either case, the CTA message will be programmed such that the CTA message will only be displayed for the desired period of time (e.g., the countdown time period). In operation S7080, the user may click or scan the CTA message using either the primary user device or the secondary user device and the CTA message will launch the default SMS application on the user's device and start the composition of a new SMS message. Further, the CTA message will cause the new SMS message to be automatically populated with the message recipient information and the message body for the MO SMS message, including the previously generated signature. In operations S7090 and S7100, the MO SMS message is transmitted to either the authentication/verification server 140 or the client device 130, depending on whether the message recipient information for the MO SMS message was for a phone number (static or dynamic) associated with the authentication/verification server 140 or the client device 130. If the MO SMS message was transmitted to the client device 130, in operation S7091, the client device 130 forwards the MO SMS message to the authentication/verification server 140. In either event, in operation S7110, the authentication/verification server 140 transmits a network response to the client device 130 indicating that the MO SMS message was successfully received by the authentication/verification server 140.

In operation S7120, the authentication/verification server 140 will determine, look-up, and/or query whether the signature included in the MO SMS message matches a signature previously calculated for the user's phone number within the same desired time period as the countdown time period, or in other words, determine whether the signature is the same signature calculated in operations S7040A/S7040B. If the signatures match, the authentication/verification server 140 will determine that the user has successfully verified their phone number and/or the authentication of the user request was successful, etc. Additionally, the delayed and/or held back MT SMS message is cancelled, deleted, etc., without being transmitted to the user device.

In optional operation S7103, according to some example embodiments, the authentication/verification server 140 may perform a potential fraud check of the user device by performing a HLR lookup on the user's phone number. The authentication/verification server 140 will then receive and/or obtain the IMSI assigned to and/or provisioned to the user's SIM card as the result of the HLR lookup. The authentication/verification server 140 may then compare the IMSI associated with the user device which transmitted the MO SMS message with the IMSI assigned to the user's SIM card and determine whether the IMSI has been changed. In the event that the IMSI does not match, the authentication/verification server 140 may determine that a potential fraud is occurring, or in other words, the results of the IMSI comparison may be used as a potential fraud indicator, etc.

In operation S7140, the authentication/verification server 140 may transmit a network request including the verification and/or authentication status information, and optionally, the potential fraud indicators (e.g., the results of the IMSI comparison, etc.), but the example embodiments are not limited thereto. In operation S7150, the client device 130 may transmit a network response indicating successful receipt of the network request of S7140. In operation S7160, the client device 130 may transmit a screen and/or message to the client device indicating the results of the authentication and/or verification, e.g., the status of the authentication and/or verification, but the example embodiments are not limited thereto. For example, if the potential fraud indicators are positive (e.g., the results of the IMSI comparison indicate the IMSI numbers do not match, etc.), the client device 130 may automatically block the user access attempt and/or lock out the user's account instead of displaying a notification of the unsuccessful user access attempt, etc., but the example embodiments are not limited thereto.

According to some example embodiments, a second transmission flow path may be followed after operation S7060, beginning with operation S7170, and may omit one or more of the operations S7070 to S7160, but the example embodiments are not limited thereto. In optional operation S7170, similar to operation S7130, the authentication/verification server 140 may perform a HLR lookup on the user's phone number to determine whether the IMSI of the user's current device matches any previously determined IMSIs for the same phone number. In optional operation S7180, the authentication/verification server 140 may transmit a network request indicating the results of the potential fraud indicator determination, etc. In optional operation S7190, the client device 130 may transmit a network response to the authentication/verification server 140 providing instructions to the authentication/verification server 140 on whether to release the MT SMS message in view of any potential fraud indicators, or in other words, the client device 130 may provide instructions to the authentication/verification server 140 to cancel the transmission of the MT SMS message based on the results of the IMSI check performed in operation S7170, etc. In operation S7200, the authentication/verification server 140 may release and/or transmit the MT SMS message containing the OTP code in the message body to the user's phone number upon the expiration of the countdown time period, or in the event that a proxy phone number is used, forward the MT SMS message to the user's actual phone number, etc. In operation S7210, the user may enter the OTP code included in the message body of the MT SMS message in a website and/or app associated with the client device 130, but the example embodiments are not limited thereto, and for example, the website and/or app may be associated with the authentication/verification server 140 and/or the OTP code may otherwise be transmitted to the authentication/verification server 140, etc. Additionally, the client device 130 and/or the authentication/verification server 140 may verify whether the OTP code entered/transmitted by the user is authentic, and based on the results of the verification of the OTP code, may determine whether the user access attempt is successful or not.

Various example embodiments are directed towards an improved user authentication and/or verification system, method, apparatus, and/or non-transitory computer readable medium. At least one example embodiment provides for increased security measures which decrease and/or eliminate the risk of malicious actors using SIM card cloning or spoofing, MITM attacks, etc., during a 2FA/multi-factor authentication/verification procedure for an online service. Additionally, at least one example embodiment multiple provides avenues for performing authentication/verification, thereby improving user convenience, or alternatively decreasing and/or minimizing user inconvenience, thereby increasing the likelihood that the user will use the multi-factor authentication/verification procedures provided by the example embodiments.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An authentication/verification-server for authenticating and verifying users of an online service, the authentication/verification server comprising:

a memory storing computer readable instructions; and processing circuitry configured to execute the computer readable instructions to cause the authentication/verification server to:

receive a network request from a client server associated with the online service in response to a user access attempt of the online service associated with a user, the network request including message recipient information for a mobile-terminated (MT) short message service (SMS) message and a unique one-time password or pin (OTP) code associated with the user, calculate at least one first signature based on the network request and a shared secret key, the shared secret key being a cryptographic key shared with the client server, the at least one first signature associated with the user, transmit a network response to the client server, the network response causing the client server to determine a device type of at least one user device associated with the user and transmit a call-to-action (CTA) message to the at least one user device associated with the user based on the determined device type, determine whether a mobile-originated (MO) SMS message corresponding to the CTA message was received within a desired response time period, and based on results of the determination of whether the MO SMS message corresponding to the CTA message was received within the desired response time period, determine a status of the user access attempt.

2. The authentication/verification server of claim 1, wherein the user access attempt corresponds to at least one of:

a user account creation attempt on the online service, a user account log-in attempt on the online service, a transaction attempt on the online service, a new user device log-in attempt on the online service, a log-in attempt at a new geographical location, a password reset with the online service, a new support request with the online service, adding or editing personal account information with the online service, or any combinations thereof.

3. The authentication/verification server of claim 1, wherein the message recipient information includes at least one of:

a mobile phone number associated with the user, a public switched telephone network (PSTN) phone number associated with the user, a virtual phone number associated with the user, a proxy phone number associated with the authentication/verification server, a proxy phone number associated with the client server, or any combinations thereof.

4. The authentication/verification server of claim 1, wherein the authentication/verification server is further caused to:

receive the MO SMS message from the at least one user device via the authentication/verification server, or receive the MO SMS message from the at least one user device via the client server;

determine the status of the user access attempt based on contents of the received MO SMS message, the calculated at least one first signature, and the desired response time period; and transmit the determined status of the user access attempt to the client server.

5. The authentication/verification-server of claim 4, wherein the MO SMS message includes a second signature; and the authentication/verification server is further caused to determine the status of the user access attempt by:

determining whether the MO SMS message is received before expiration of the desired response time period, determining whether the second signature matches at least one of the calculated at least one first signature associated with the user, and determining whether the matching first signature was calculated during the desired response time period.

6. The authentication/verification server of claim 1, wherein the authentication/verification server is further caused to:

perform a home location register (HLR) lookup on a phone number associated with the at least one user device to determine an International Mobile Subscriber Identity (IMSI) number associated with the phone number;

determine fraud potential information associated with the user access attempt based on the determined IMSI number; and transmit the determined fraud potential information to the client server.

7. The authentication/verification server of claim 1, wherein the network response includes at least one communication account identifying information associated with the authentication/verification server or the client server, the at least one communication account identifying information being at least one of:

a local phone number, a national phone number, an international phone number, a toll-free phone number, a mobile phone number, a short code, a long code, a network specific number, or any combinations thereof.

8. The authentication/verification server of claim 1, wherein the at least one user device includes at least a mobile phone device associated with the user; and the authentication/verification server is further caused to, generate the MT SMS message in response to the received network request, the MT SMS message including the OTP code associated with the user and the message recipient information, the message recipient information being a phone number associated with the mobile phone device; and transmit the MT SMS message to the mobile phone device associated with the user in response to an expiration of the desired response time period or a determined status of the user access attempt indicating failure.

9. The authentication/verification server of claim 8, wherein the authentication/verification server is further caused to:

cancel transmission of the MT SMS message to the mobile phone device in response to the determined status of the user access attempt indicating success prior to the expiration of the desired response time period.

10. The authentication/verification server of claim 1, wherein the authentication/verification server is further caused to calculate the at least one first signature by:

generating a unique keyed-hash using a desired hashing algorithm on at least the OTP code, and the shared secret key.

11. The authentication/verification server of claim 1, wherein the network request includes a message body; and the authentication/verification server is further caused to calculate the at least one first signature by:

generating a unique keyed-hash using a desired hashing algorithm on the message body included in the network request and the shared secret key.

12. A client server associated with an online service, the client server comprising:

a memory storing computer readable instructions; and processing circuitry configured to execute the computer readable instructions to cause the client server to:

receive a user access attempt from a primary user device associated with a user, the user access attempt including at least a phone number associated with the user, generate a unique one-time password or pin (OTP) code associated with the user, transmit a network request to an authentication/verification server, the network request including message recipient information for a mobile-terminated (MT) short message service (SMS) message and the OTP code, the network request causing the authentication/verification server to calculate at least one first signature associated with the user based on the network request and a shared secret key, the shared secret key being a cryptographic key shared with the authentication/verification server, receive a network response from the authentication/verification server, determine a device type of the primary user device, generate a call-to-action (CTA) message for the user based on the determined device type, and transmit the CTA message to the primary user device.

13. The client server of claim 12, wherein the phone number associated with the user is at least one of:

a mobile phone number associated with the user, a public switched telephone network (PSTN) phone number associated with the user, a virtual phone number associated with the user, a proxy phone number associated with the authentication/verification server, a proxy phone number associated with the client server, or any combinations thereof.

14. The client server of claim 12, wherein the transmitting of the CTA message causes the primary user device to display the CTA message to the user for a desired response time period.

15. The client server of claim 14, wherein the network response includes at least one communication account identifying information associated with the authentication/verification server or the client server;

in response to the device type of the primary user device being a mobile phone device, the CTA message includes a clickable CTA;

in response to the device type of the primary user device being a non-mobile phone device, the CTA message includes a scannable CTA, the scannable CTA being at least one of a barcode or quick response (QR) code; and the clickable CTA and the scannable CTA are both configured to cause the mobile phone device to automatically compose a mobile-originated (MO) SMS message, the automatically composing the MO SMS message including, pre-populating a message recipient field of the MO SMS message with the at least one communication account identifying information associated with the authentication/verification server or the client server, and pre-populating a message body of the MO SMS message with the calculated at least one first signature associated with the user.

16. The client server of claim 15, wherein the client server is further caused to:

receive the MO SMS message from the primary user device or a secondary user device; and forward the MO SMS message to the authentication/verification server.

17. The client server of claim 15, wherein the client server is further caused to:

receive a user access attempt status message from the authentication/verification server, the user access attempt status message indicating a determined status of the user access attempt.

18. The client server of claim 17, wherein the client server is further caused to:

transmit a message to the primary user device in response to expiration of the desired response time period or the determined status of the user access attempt indicating failure, the message prompting the user to enter the OTP code;

receive a user input from the primary user device; and determine the user access attempt status based on the received user input and the OTP code associated with the user.

19. The client server of claim 15, wherein the at least one communication account identifying information associated with the authentication/verification server or the client server is at least one of:

a local phone number, a national phone number, an international phone number, a toll-free phone number, a mobile phone number, a short code, a long code, a network specific number, or any combinations thereof.

20. The client server of claim 12, wherein the client server is further caused to:

receive fraud potential information associated with the user access attempt from the authentication/verification server, the fraud potential information determined based on an International Mobile Subscriber Identity (IMSI) number associated with the phone number associated with the user received from a home location register (HLR) lookup performed on the phone number associated with the user; and determine a user access attempt status based on the received fraud potential information.

21. The client server of claim 12, wherein the user access attempt corresponds to at least one of:

a user account creation attempt on the online service, a user account log-in attempt on the online service, a transaction attempt on the online service, a new user device log-in attempt on the online service, a log-in attempt at a new geographical location, a password reset with the online service, a new support request with the online service, adding or editing personal account information with the online service, or any combinations thereof.

22. A user device associated with a user accessing an online service, the user device comprising:

a memory storing computer readable instructions; and processing circuitry configured to execute the computer readable instructions to cause the user device to:

transmit a user access attempt to a client server associated with the online service, the user access attempt including at least a phone number associated with the user, the user access attempt causing the client server to, generate a unique one-time password or pin (OTP) code associated with the user, transmit a network request to an authentication/verification server, the network request including message recipient information for a mobile-terminated (MT) short message service (SMS) message and the OTP code, receive a network response from the authentication/verification server in response to the network request, and determine a device type of the user device, receive a call-to-action (CTA) message from the client server, the CTA message generated based on the determined device type, and display the CTA message to the user for a desired response time period.

23. The user device of claim 22, wherein the user device is further caused to:

receive a user input engaging the CTA message;

automatically compose a mobile originated (MO) short message service (SMS) message in response to the user input, the automatically composing the MO SMS message including pre-populating a message recipient field of the MO SMS message with at least one communication account identifying information associated with the authentication/verification server or associated with the client server, and pre-populating a message body of the MO SMS message with at least one signature associated with the user calculated by the client server;

transmit the MO SMS message to the at least one communication account identifying information associated with the authentication/verification server or the client server; and receive a user access attempt status message corresponding to the user access attempt from the client server in response to the transmitted MO SMS message.

24. The user device of claim 23, wherein the user device is further caused to:

receive a mobile-terminated (MT) SMS message from the authentication/verification server in response to an expiration of the desired response time period or the user access attempt status message indicating failure of the user access attempt, the MT SMS message prompting the user to enter the unique one-time password or pin (OTP) code;

receive a second user input from the user in response to the MT SMS message; and transmit a user response message to the client server, the user response message including the second user input.

25. The user device of claim 23, wherein the at least one communication associated with the account identifying information authentication/verification server or the client server is at least one of:

a local phone number, a national phone number, an international phone number, a toll-free phone number, a mobile phone number, a short code, a long code, a network specific number, or any combinations thereof.

* * * * *